US012655655B1

(12) United States Patent
Jaiswal

(10) Patent No.: US 12,655,655 B1

(45) Date of Patent: Jun. 16, 2026

(54) AUTOMATED GATE FOR ROBOTIC MOWERS

(71) Applicant: SmartDots LLC, Frisco, TX (US)

(72) Inventor: Ashutosh Jaiswal, Frisco, TX (US)

(73) Assignee: SmartDots LLC, Frisco, TX (US)

( * ) Notice: Subject to any disclaimer, the term of this patent is extended or adjusted under 35 U.S.C. 154(b) by 0 days.

(21) Appl. No.: 18/983,195

(22) Filed: Dec. 16, 2024

(51) Int. Cl.
*E05B 47/00* (2006.01)
*E06B 11/02* (2006.01)

(52) U.S. Cl.
CPC ........ *E05B 47/0001* (2013.01); *E06B 11/022* (2013.01); *E05B 2047/0016* (2013.01); *E05B 2047/002* (2013.01); *E05B 2047/0058* (2013.01); *E05B 2047/0068* (2013.01)

(58) Field of Classification Search
CPC ......... E05B 47/0001; E05B 2047/0016; E05B 2047/002; E05B 2047/0058; E06B 11/022
See application file for complete search history.

(56) References Cited

U.S. PATENT DOCUMENTS 10,159,181 B2 * 12/2018 Crandall .............. A01B 69/008
12,044,056 B2 * 7/2024 Frick ..................... E05F 15/616
12,286,813 B2 * 4/2025 Fie ........................... E05B 65/00
2005/0252622 A1 * 11/2005 Reid ......................... E06B 7/32 160/180
2008/0097645 A1 * 4/2008 Abramson ........... A01D 34/008 700/258
2011/0149079 A1 * 6/2011 Anderson ................ G07C 9/28 348/E7.085
2016/0186485 A1 * 6/2016 Taylor ................... E05F 15/611 49/31
2019/0136563 A1 * 5/2019 Crandall ................. E05F 15/79
2019/0138025 A1 * 5/2019 Crandall ................. E04H 6/426
2022/0048466 A1 * 2/2022 Linden .................... B60R 25/01
2023/0203842 A1 * 6/2023 Jaiswal ................. E06B 11/022 49/386

* cited by examiner

*Primary Examiner* — Mark A Williams
(74) *Attorney, Agent, or Firm* — Kirby Drake

(57) ABSTRACT

An automated gate for robotic mowers may include at least one door that may be sized to receive a robotic mower, and it can be installed in any fence to enable the mower to move between the yards on its own. The at least one door of an automated gate may provide optional capability to lock when not used by the mower and unlock automatically when the mower gets close. By default, the at least one door may remain unlocked, yet closed, thereby providing a cost-effective solution for customers who do not have to worry about pets. An add-on module may be provided that may add a locking mechanism and triggering mechanism, thereby providing end users with the ability to lock the automated gate completely.

11 Claims, 28 Drawing Sheets

UNLOCKED - READY TO LATCH

MOVING TO LATCHING

AUTOMATED GATE FOR ROBOTIC MOWERS

CROSS REFERENCE TO RELATED APPLICATIONS

This application is a continuation-in-part of U.S. Pat. No. 18,111,868 filed Feb. 20, 2023, which is a continuation-in-part of U.S. patent application Ser. No. 17/187,774 filed Feb. 27, 2021 which claims the benefit under 35 U.S.C. § 119(e) of U.S. Provisional Patent Application Ser. No. 62/983,146 filed on Feb. 28, 2020, entitled "Automated Gate for Robotic Mowers," each of which is incorporated by reference in its entirety.

FIELD OF THE DISCLOSURE

The present disclosure generally relates to gates, and more particularly to automated gates for robotic mowers.

BACKGROUND

Robotic mowers have gained popularity in the recent years due to advancements in technology and manufacturing. A robotic lawn mower autonomously navigates through a yard and mows the grass without manual intervention. While these mowers may be designed to tackle almost any complex garden layout, not all challenges are overcome by the mower itself. More and more homes are built these days where the backyard is fenced in and is separated from the front yard. In such scenarios, it becomes impossible for the mower to mow both the front and back yards without manual intervention. One way to overcome this problem is to have an opening in the fence to enable the mower to move between the yards autonomously. The challenge with having such an opening is that it raises security concerns, privacy concerns, pet safety concerns, and aesthetical challenges.

SUMMARY

Embodiments of the present disclosure may provide an automated gate for a robotic mower to move through a fence, the gate may comprise a frame, at least two doors, a plurality of two-way hinges, at least two springs, a triggering matrix, and a locking mechanism. The frame may be attached to the fence. The plurality of two-way hinges may be attached to the frame and the at least two doors. The plurality of two-way hinges may be operable to allow the at least two doors to move in two directions. The at least two springs may be attached to the frame and the at least two doors and may be operable to return the at least two doors to a closed position when they are opened. The triggering matrix may further comprise a plurality of magnet sensors that may be on either side of the fence, a magnet that may be attached to a front underside of the robotic mower, a processor that may be attached to the frame, and a length of wire that may connect the plurality of magnetic sensors to the processor. The locking mechanism may further comprise a horizontal beam, a linear actuator that may be attached to and may be operable to move the horizontal beam, a support bar, at least two elbows, at least two door stops that may be attached to the at least two doors, and at least two clasps. The at least two elbows may have one end pivotably attached to opposite ends of the support bar, and the at least two elbows may be in contact with the horizontal beam. The at least two clasps may be pivotably attached to opposite ends of the support bar. The at least two clasps may have a cut-out on an upper side and a cut-out on a bottom side, wherein the cut-out on the upper side may be operable to accept the at least two elbows and the cut-out on the bottom side may be operable to accept the at least two door stops.

Other embodiments of the present disclosure may provide the automated gate that may be made of steel. The frame of the gate may have a groove on a top side to assist in attachment to the fence. The frame may also be longer than the robotic mover width by approximately 1.5 times the width of the robotic mower which may accommodate different angles at which the robotic mower enters the automated gate. The at least two doors may further comprise a plurality of holes to reduce the weight of the at least two doors and to reduce the effect of wind on the gate. The at least two doors may be positioned such that a bottom edge of the at least two doors is at least two inches above ground level. The magnet in the triggering matrix may be encased in a plastic enclosure to protect it from the blades of the robotic mower. The linear actuator may have a direct current motor and may be battery powered.

Another embodiment of the present disclosure may provide an automated gate for a robotic mower through a fence, the automated gate comprising a frame attached to the fence, at least two doors, a plurality of two-way hinges, and at least two springs. The plurality of two-way hinges may be attached to the frame and the at least two doors, and the plurality of two-way hinges may be operable to allow the at least two doors to move in two directions. The at least two springs may be attached to the frame and the at least two doors. The at least two springs may be operable to return the doors to a closed position when they are opened.

Other embodiments of the present disclosure may provide that the automated gate may have a lock add-on that may comprise a triggering matrix and a locking mechanism. The triggering matrix may comprise a plurality of magnet sensors on either side of the automated gate, a magnet attached to a front underside of the robotic mower, a processor that may attach to the frame, and a length of wire that may connect the plurality of magnetic sensors to the processor. The locking mechanism may attach to the frame and may comprise a horizontal beam, a linear actuator that may be attached to and may be operable to move the horizontal beam, a support bar, at least two elbows, at least two door stops that may be attached to the at least two doors, and at least two clasps. The at least two elbows may have one end pivotably attached to opposite ends of the support bar, and the at least two elbows may be in contact with the horizontal beam. The at least two clasps may be pivotably attached to opposite ends of the support bar. The at least two clasps may have a cut-out on an upper side and a cut-out on a bottom side, wherein the cut-out on the upper side may be operable to accept the at least two elbows and the cut-out on the bottom side may be operable to accept the at least two door stops. The gate may be made of steel. The frame may have a groove on a top side to assist in attachment to the fence. The frame may also be longer than the robotic mover width by approximately 1.5 times the width of the robotic mower which may accommodate different angles at which the robotic mower enters the automated gate. The at least two doors may further comprise a plurality of holes to reduce the weight of the at least two doors and to reduce the effect of wind on the gate. The at least two doors may be positioned such that a bottom edge of the at least two doors is at least two inches above ground level. The magnet in the triggering matrix may be encased in a plastic enclosure to protect it from the blades of the robotic mower. The linear actuator may have a direct current motor and may be battery powered.

Other embodiments of the present disclosure may provide a method of controlling an automated gate for a robotic mower. The method may comprise receiving a signal from a triggering matrix, sending the received signal to a linear actuator which may unlock at least two doors of the automated gate, setting a timer for a specified period of time, sending a query if the at least two doors are closed after the specified period of time has elapsed, receiving a response confirming that the at least two doors are closed, and sending a signal to the linear actuator that may lock the at least two doors.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide an automated gate for a robotic mower that may include at least a mountable metal frame, a metal door, and a double-sided hinge.

In an embodiment of the present disclosure, the door may be formed of a high-quality steel that may be powdered-coated with paint. While the door is depicted as being constructed of metal, it should be appreciated that other materials may be used that may provide for a durable (i.e., that can withstand external factors, such as weather) door having consistent performance (i.e., due to constant use of the door) without departing from the present disclosure. Other materials may include, but are not limited to, wood, plastic, metal, and combinations of these materials. The door may include one or more perforations that may reduce wind load on the door and assist in decreasing the overall weight of the door. The door may be constructed within a frame that may be pre-hinged, thereby making it easy to install. The door may include screw holes and/or mounting grooves for installing the automated lock as an add-on device in embodiments of the present disclosure.

Figure 1:
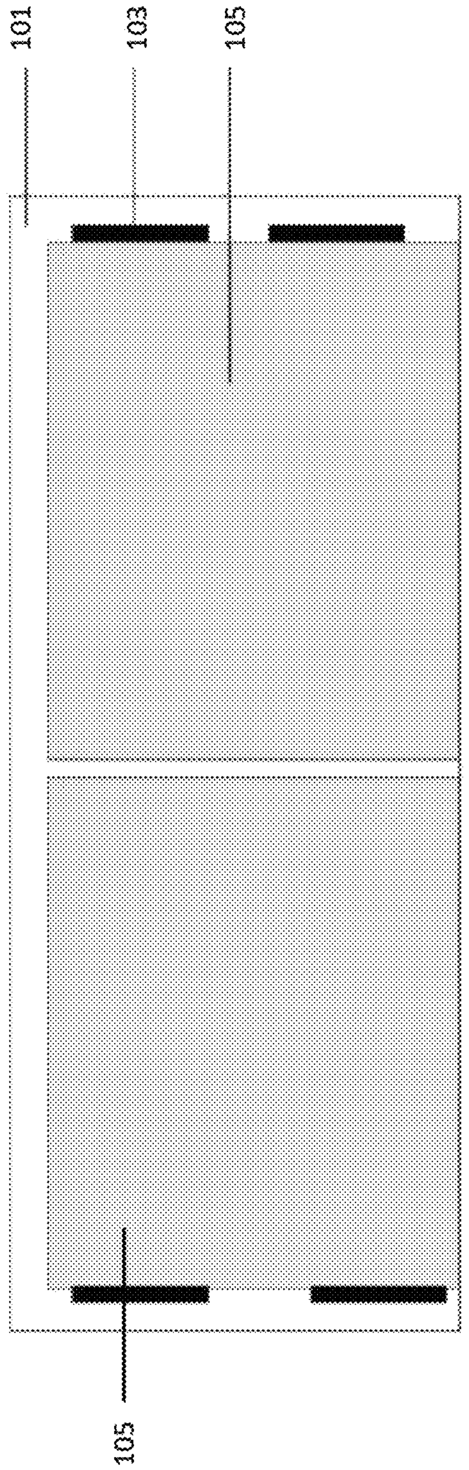
FIG. 1 depicts an automated gate according to an embodiment of the present disclosure.
Figure 2:
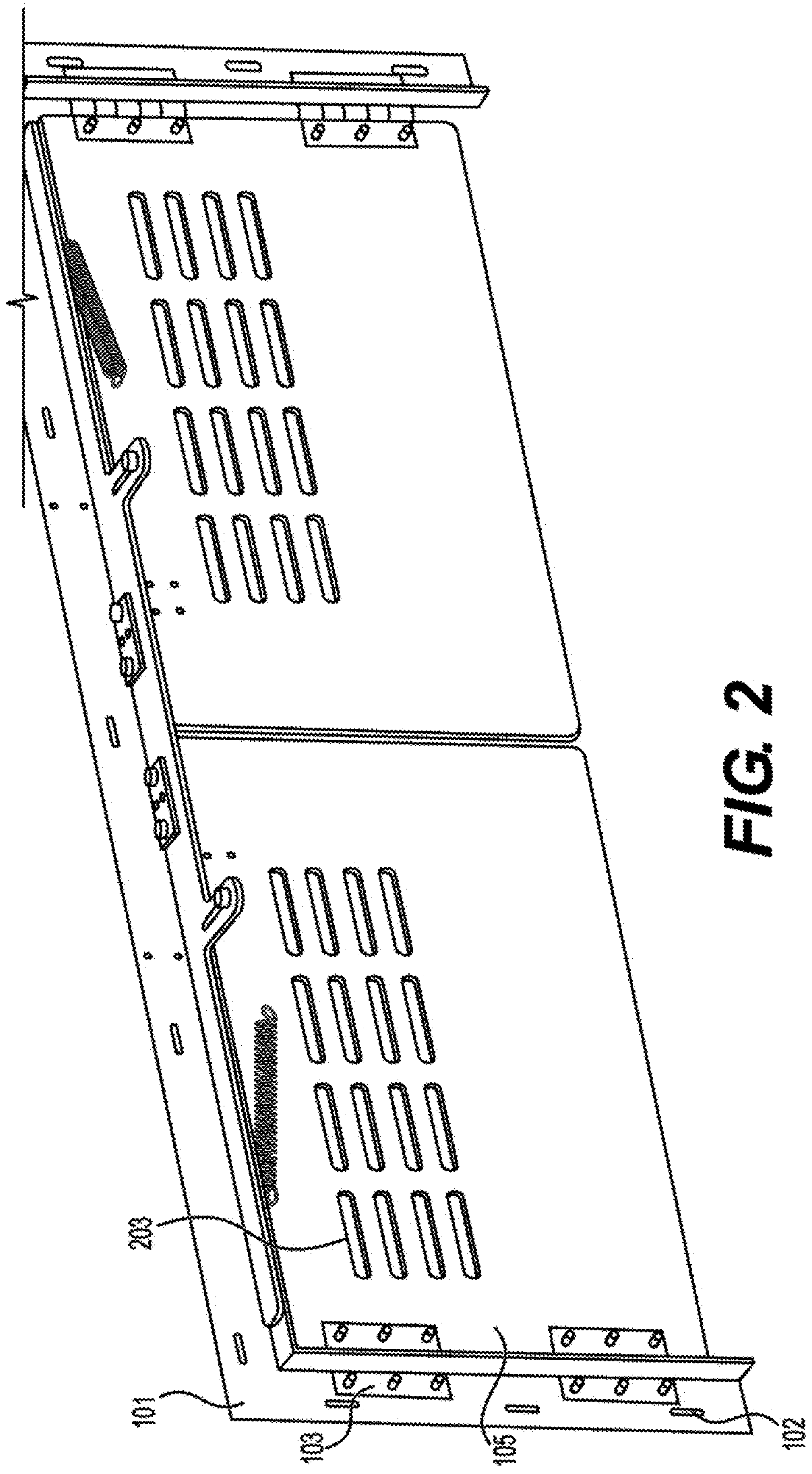
FIG. 2 depicts a back side of the automated gate of FIG. 1 according to an embodiment of the present disclosure.

A dual door design may be provided to distribute the weight of the door evenly into two parts, thereby reducing the impact on the mower without compromising the material and quality of the door itself. As shown in FIGS. 1-2, two doors may swing both ways. An extended arm may be used to add an external spring such that there is enough room between the door and the frame on the top to allow the spring to extend without interrupting with the operation of the door. The tension of the spring was determined such that it is sufficient for the mower to be able to push the door without triggering the obstacle detection sensors on the mower. It also should be appreciated that the spacing of the door on the top, with respect to the frame may be sufficient to allow the spring to extend when the door is opened either way and at the same time to ensure that the aesthetic appeal is not lost.

FIG. 1 depicts an automated gate according to an embodiment of the present disclosure. The automated gate may be attached to a fence by frame 101. Frame 101 may be a mountable metal frame in an embodiment of the present disclosure. The automated gate may feature at least two doors 105. The at least two doors 105 may be metal in an embodiment of the present disclosure. The at least two doors 105 may be attached to frame 101 by a plurality of double-sided hinges 103. The plurality of double-sided hinges 103 may allow the at least two doors 105 to open in either direction depending on the direction the mower is moving relative to the automated gate in embodiments of the present disclosure.

FIG. 2 depicts a back side of the automated gate of FIG. 1 according to an embodiment of the present disclosure. Frame 101 may have a plurality of holes 102 around it that may allow it to be secured to the fence. The at least two doors 105 may have a plurality of air holes 203 to help reduce the air pressure on each of the at least two doors 105. The plurality of air holes 203 may help reduce the weight of the at least two doors 105 and may help the automated gate maintain integrity in windy conditions. The at least two doors 105 may be connected to frame 101 by a plurality of double-sided hinges 103. To keep the at least two doors 105 closed at all times when the mower is not moving through the gate, the gate may feature at least two springs 201. The at least two springs 201 may be attached to a top part of frame 101. The at least two springs 201 may be operable to stretch when the at least two doors 105 are opened in either direction and then return to their regular form which may pull the at least two doors 105 closed.

Various elements may ensure that an automatic gate according to embodiments of the present disclosure does not get too heavy on the fence that supports the gate or on the robotic mower. The at least two doors 105 may be raised several inches above the ground to minimize chances of friction with tall grass or uneven surfaces. Further, frame 101 width may be longer than the mower width by approximately 1.5 times the width of the mower to accommodate different angles at which the robotic mower may enter the door and to maximize the success rate. Frame 101 also may be designed with a groove such that it may be easily mounted to different types of fences, such as wood or metal fences.

An automated gate according to embodiments of the present disclosure may include an automated lock to keep the automated gate locked when the mower is not accessing the at least two doors 105. This automated lock may comprise an electronic circuit design complemented by a locking mechanism design on the door itself.

Figure 3:
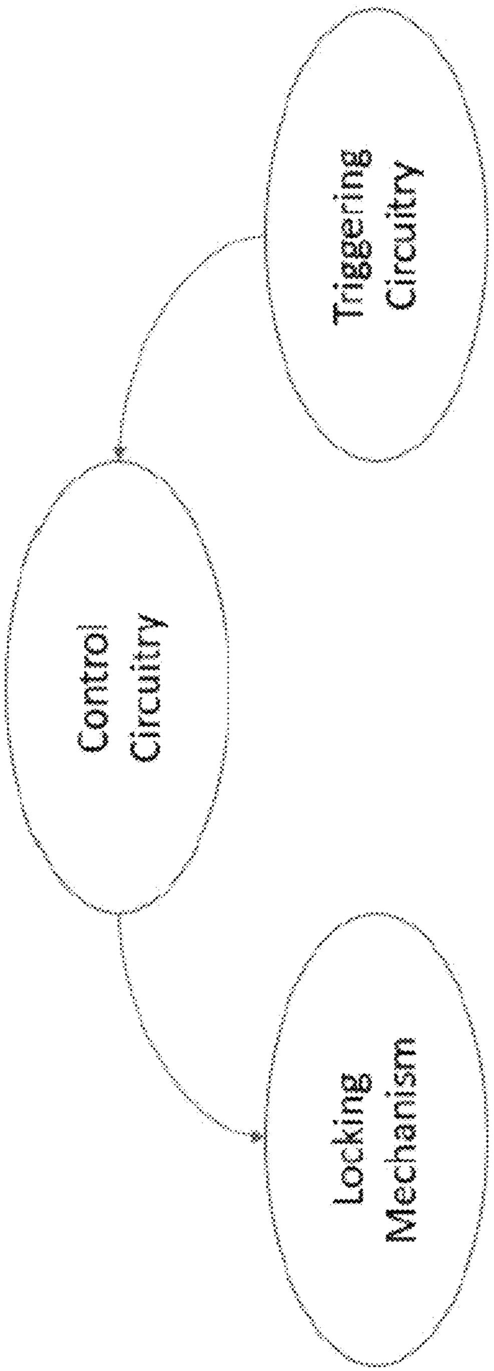
FIG. 3 depicts an automated lock according to an embodiment of the present disclosure.

FIG. 3 depicts an automated lock according to an embodiment of the present disclosure. The automated lock may include, but is not limited to, triggering circuitry, control circuitry, and a locking mechanism. Each of these components will be discussed in more detail below.

The triggering circuitry may inform when the robotic mower needs to access the gate so that the gate can be unlocked. The triggering circuitry may include two main components: a sensor matrix that may be laid in the ground on either side of the at least two doors 105 (FIGS. 1, 2); and a magnet that may be mounted under the robotic mower. The sensor matrix may contain sensors that may open/close based on proximity of a magnet. As the robotic mower passes over the sensor matrix, the sensor matrix may generate a trigger that may be sent to the control circuitry for further processing. A dual trigger setup may be used on both sides in order to ensure that the trigger only occurs when the mower attempts to enter the doorway using the guide wire. A false trigger during normal mowing may be avoided with such a design. FIG. 4C depicts a top view of a sensor setup. The magnet may be screwed under the robotic mower, sealed in a plastic/polyvinyl chloride (PVC) enclosure, and clipped onto the front portion of the robotic mower, such that it may be positioned within 2-4 inches above the ground in an embodiment of the present disclosure. FIGS. 4D-4E depict magnet housings according to embodiments of the present disclosure. However, it should be appreciated that the magnet may be secured under the robotic mower, sealed in a different type of enclosure, and/or secured to the robotic mower in different manners without departing from the present disclosure. As the triggering circuitry on the mower side only contains a magnet with a mount, this may eliminate the requirement of any battery-operated device on the mower. In an embodiment of the present disclosure, the triggering circuitry may be laid underground with wires run to the control circuitry. This may make the set up less visible within the yard.

The control circuitry may be considered the brain of the automated lock. The control circuitry may accept inputs from the triggering circuit and then control the state of the automated lock depending in different situations. The control circuitry may determine when to lock or unlock the at least two doors 105. The control circuitry may receive a trigger from the triggering circuitry and receive feedback on status of the at least two doors 105 based on magnets mounted on the at least two doors 105 that determine whether the at least two doors 105 are open or closed. Depending on the status of the at least two doors 105, the control circuitry may determine whether the automated lock needs to be locked or unlocked. The control circuitry may include slots to add one or more communication modules. For example, a cellular module and/or a Wi-Fi module may be included to control or read status from the door.

Figure 4A:
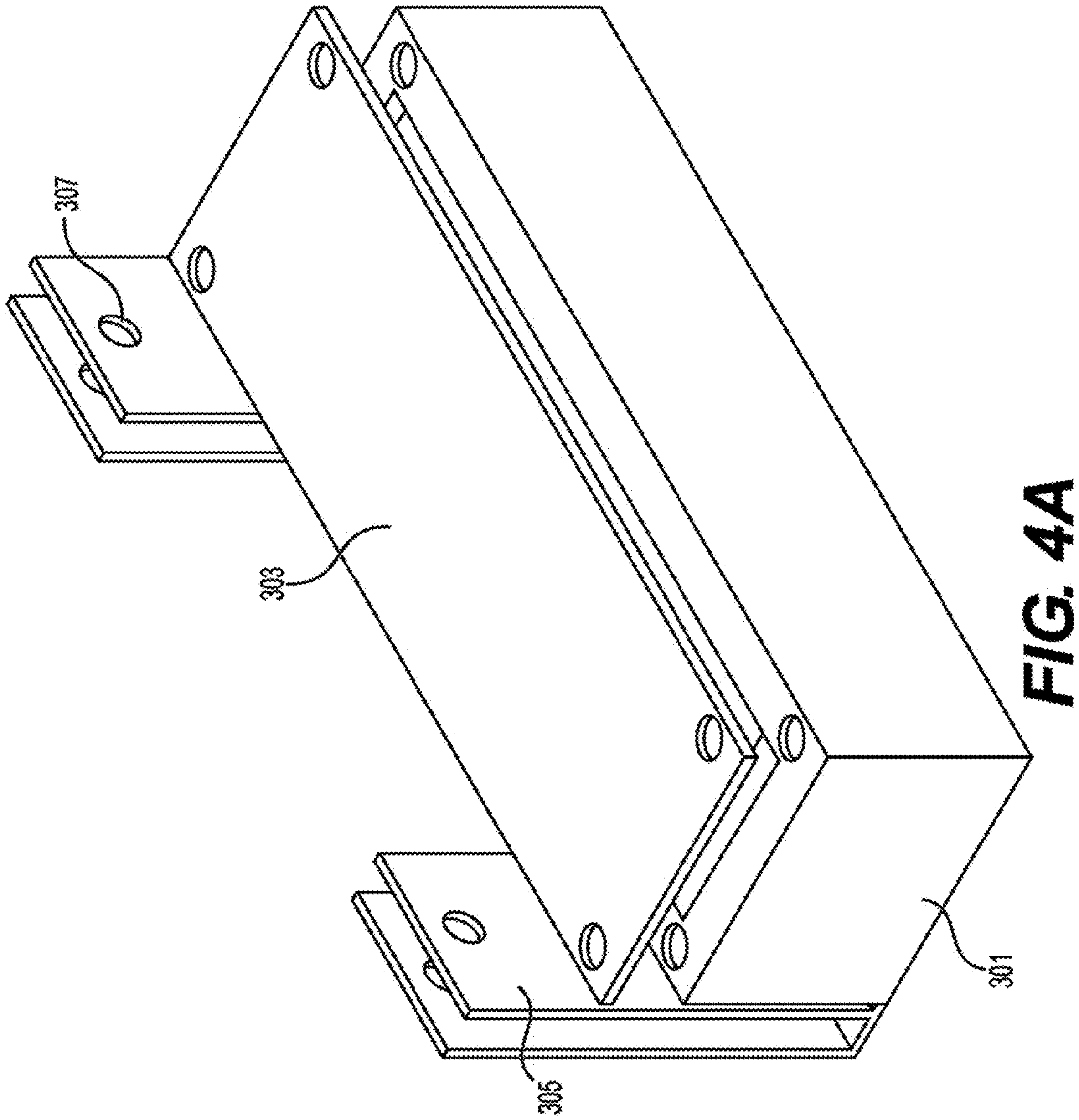
FIG. 4A depicts a magnet package according to an embodiment of the present disclosure.

FIG. 4A depicts a magnet package according to an embodiment of the present disclosure. The magnet package may feature magnet 301. Cover 303 may be attached to a top of magnet 301 which may protect magnet 301. The magnet package may have at least one L-support 305. At least one L-support 305 may protect and hold a bottom of magnet 301. At least one L-support 305 may also provide holes 307 to allow the magnet package to be attached to the underside of the automated mower. The magnet package can be connected to a front underside of the automated mower which may allow it to trigger the locking system before the mower arrives at the gate.

Figure 4B:
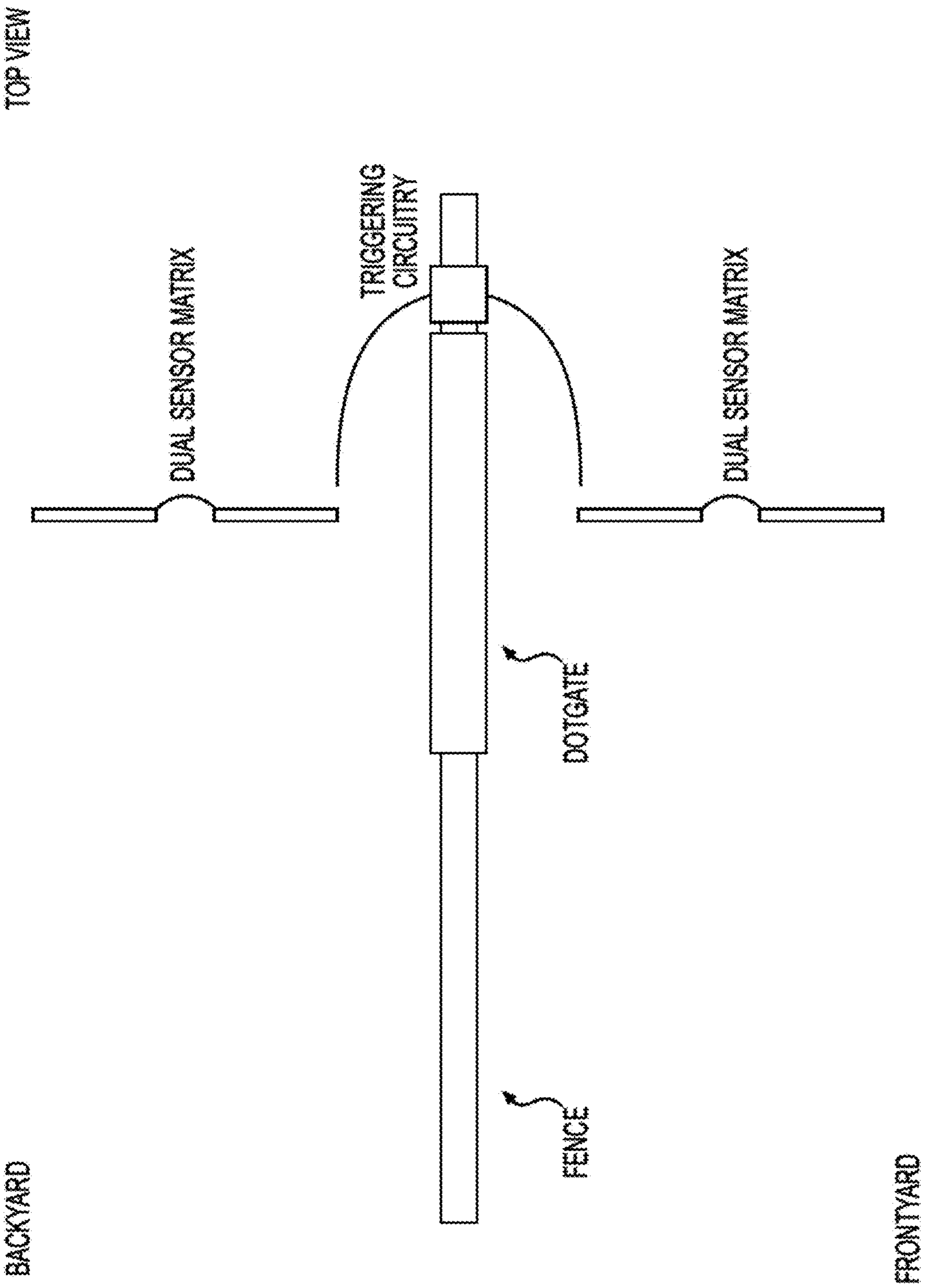
FIG. 4B depicts a sensor matrix according to an embodiment of the present disclosure.
Figure 4C:
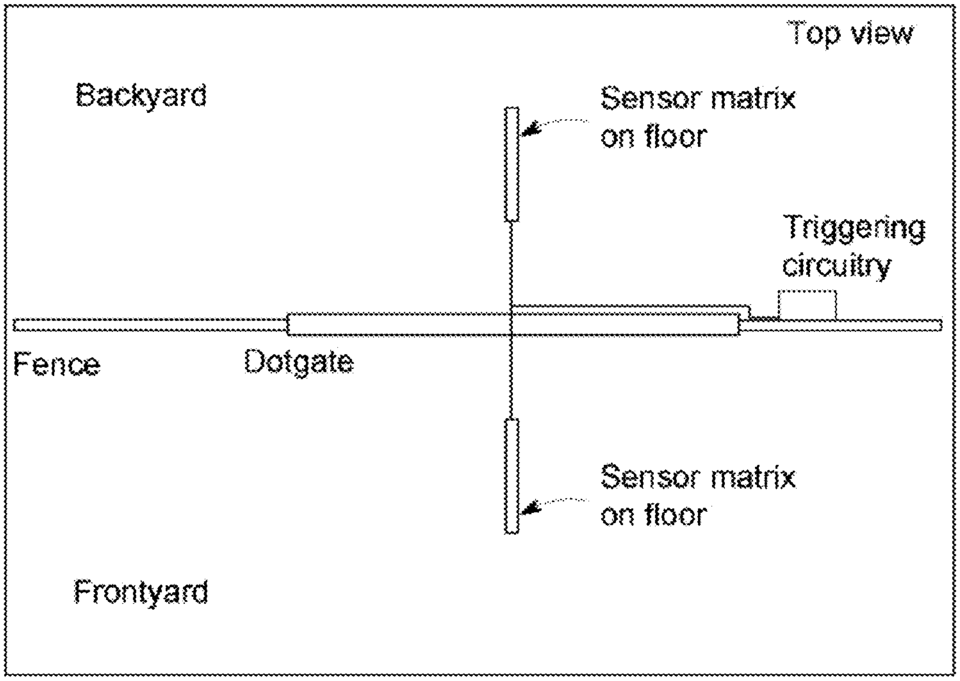
FIG. 4C depicts a sensor setup according to an embodiment of the present disclosure.
Figure 4D:
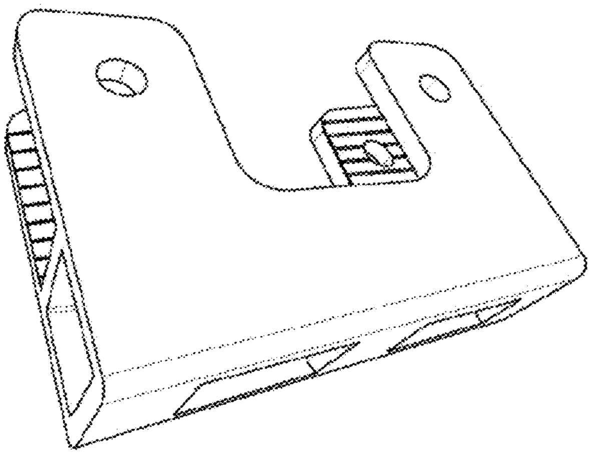
FIG. 4D depicts a magnet housing according to an embodiment of the present disclosure.
Figure 4E:
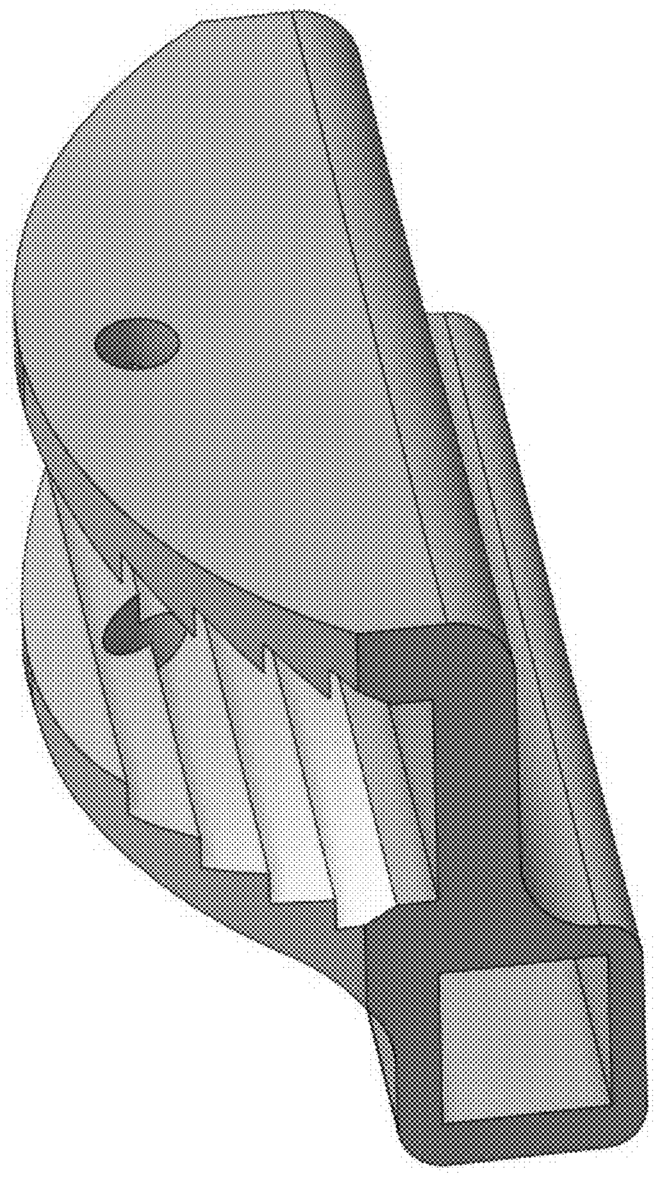
FIG. 4E depicts another magnet housing according to an embodiment of the present disclosure.

FIG. 4B depicts a sensor matrix according to an embodiment of the present disclosure. The diagram in FIG. 4B displays the system present that may enable the locking mechanism and triggering system to operate. On either side of the fence there may be two magnet sensors embedded in the ground leading up to the automated gate. The sensors may be connected through a buried wire that may connect the plurality of sensors to the triggering circuitry in the automated gate. When the automated mower with the magnet package traverses the two sensors on a given side of the fence, the sensors may send a signal to the triggering circuitry which may then trigger the locking mechanism to unlock the at least two doors 105.

Figure 5:
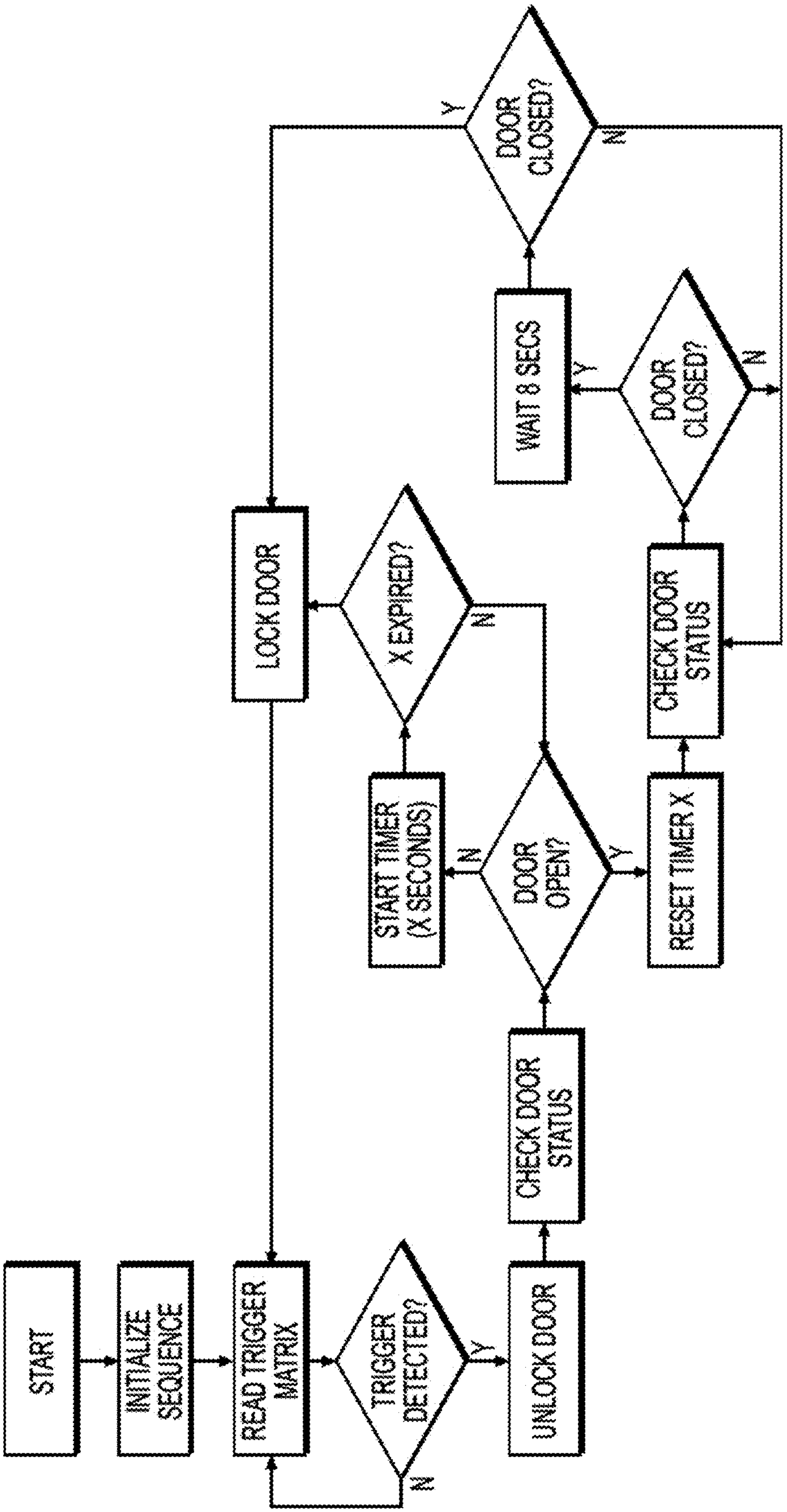
FIG. 5 depicts a high-level algorithm associated with the control circuitry according to an embodiment of the present disclosure.
Figure 8:
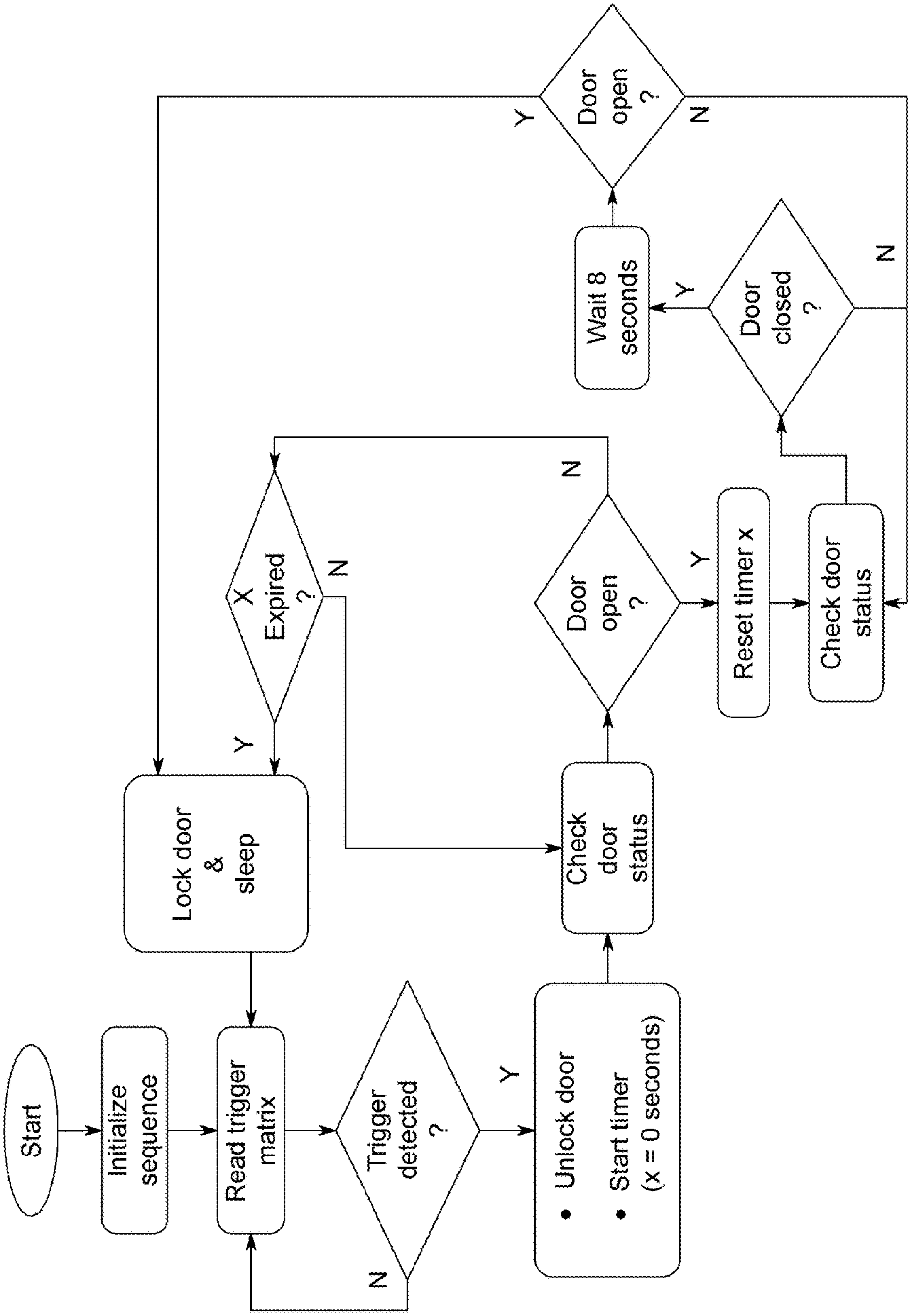
FIG. 8 depicts a high-level algorithm associated with the control circuitry according to an embodiment of the present disclosure.

FIG. 5 depicts a high-level algorithm associated with the control circuitry according to an embodiment of the present disclosure. As depicted in FIG. 5, a sequence may be initialized wherein the trigger matrix may be read. If no trigger is detected, the trigger matrix may be read again. If a trigger is detected, the door may be unlocked, and the door status may be checked. If the door is not open, a timer may be started for a predetermined period of time. Once the timer expires, the door may be locked, and then the trigger matrix may be read. If the door is open, a timer may be reset, and the door status may be checked again. If the door is closed, a waiting period (such as 8 seconds) may be employed, and the door may be checked again to confirm it is closed. If the door is not closed, the door status may be checked again. FIG. 8 depicts another high-level algorithm associated with the control circuitry. This algorithm is similar to that described with respect to FIG. 5; however, a timer may be started when the door is unlocked. When the timer expires, the door may be locked and go to sleep.

The locking mechanism of an automated lock as depicted in FIG. 3 according to an embodiment of the present disclosure may ensure that the door remains locked after it is closed, such as to avoid pets from escaping out of the opening. The locking mechanism may include a DC motor based linear actuator that may have a stroke long enough to extend out and lock the two doors together. In an embodiment of the present disclosure, the locking mechanism may be battery-powered, thereby not requiring a hard-wired power supply to operate. Solar power may be used to operate the locking mechanism in other embodiments of the present disclosure. Accordingly, the locking mechanism may run on its own as opposed to requiring power to be run directly to the location where the locking mechanism is being used.

The locking mechanism may allow a user to choose to procure the door separately or obtain a locking kit which may be an add-on module. The locking mechanism may include intelligence to activate or not activate the linear actuator when the doors are open or not properly closed.

The locking mechanism may include four independent stainless steel spring latches, two for each of the two-way doors. The latch base may have a triangular cut on one side (the outer side) for the door to swing through and is flat on the other side. All four spring latches may be attached to a stainless-steel plate that slides vertically on the main stainless-steel frame which is to be mounted on the door frame. The sliding plates may move up and down to attain unlock and lock positions respectively. The sliding plates may include four spring latches that may move up and down to attain unlock and lock positions respectively. The sliding may be achieved with a linear actuator mechanism that comprises a DC Servo motor that controls a rack and pinion combination, with the rack attached to the sliding plate and the pinion to the motor. The add-on mechanism may also have a magnetic sensor that will provide feedback about the door status to the control circuitry. The functioning of the locking mechanism may be such that it ensures that the door latches as soon as it swings back and closes, after which the actuator keeps the latch in place, locking the door. The actuator may provide freedom of movement to the latching mechanism as soon as the triggering circuit sends a signal to the control circuit.

FIGS. 6A-6D depict a latching mechanism according to an embodiment of the present disclosure. More specifically, FIGS. 6A-6D show an upper section of the automated gate and the locking mechanism that may secure it. The locking mechanism may be mounted to upper lip 609 of frame 101. At least two door stops 601 may be attached to the at least two doors 105, with one of the at least two door stops 601 being attached to each of the at least two doors 105. The at least two door stops 601 may have a general S-shape so that they may be attached to the at least two doors 105, but still allow the doors to open and close. The locking mechanism may feature support 605 (FIG. 6B) that may be attached to frame 101 as well as upper lip 609 so as to provide stability for the other components of the locking mechanism. Elbow 607 (FIG. 6C) may be pivotably attached to support 605. Clasp 603 (FIG. 6A) may be pivotably attached to the opposite end of support 605 from elbow 607. Clasp 603 may have a cut-out so that it is operable to accept door stop 601. The other end of clasp 603 may feature another cut-out operable to accept elbow 607.

A linear actuator may get a signal to unlock the gate. The linear actuator may then move causing elbow 607 to move which may pull back on the cut-out of clasp 603. When elbow 607 pulls on clasp 603, it may cause clasp 603 to no longer be at an angle that holds door stop 601 in place which may allow the at least two doors 105 to open freely. Once the mower has passed through the gate, the linear actuator may receive a signal to lock the gate again. The linear actuator may return to its original position which may then cause elbow 607 to return to its original position in the cut-out of clasp 603 which in turn will return the other cut-out in clasp 603 to return to its position around door stop 601 locking the at least two doors 105.

The initial state may be when the door is in the locked position. Once the triggering circuit senses the mower and sends a signal to the main control circuit, the actuator may pull up the latch to attain the unlock state. The door still may remain stable in the closed position with the help of ball plungers attached vertically to the main frame of the locking mechanism. The ball plungers may keep the door in closed position in case the door is unlocked while the mower is not intending to pass through the door. When the latches move down, they are aligned with the latch plate and the door is locked again.

Once unlocked, the mower then pushes to open the gate and pass through. The linear actuator may push down the sliding plate with the latches, just a few seconds after the doors are pushed open by the mower, ready to receive the doors as they swing back after letting the mower pass through. The doors swing back hitting on the triangular face of the latch base lifting the spring latches and being stopped by the flat face of the latch on the other side, thus getting into the lock state as soon as the spring latch comes down in a fraction of a second.

Figure 6B:
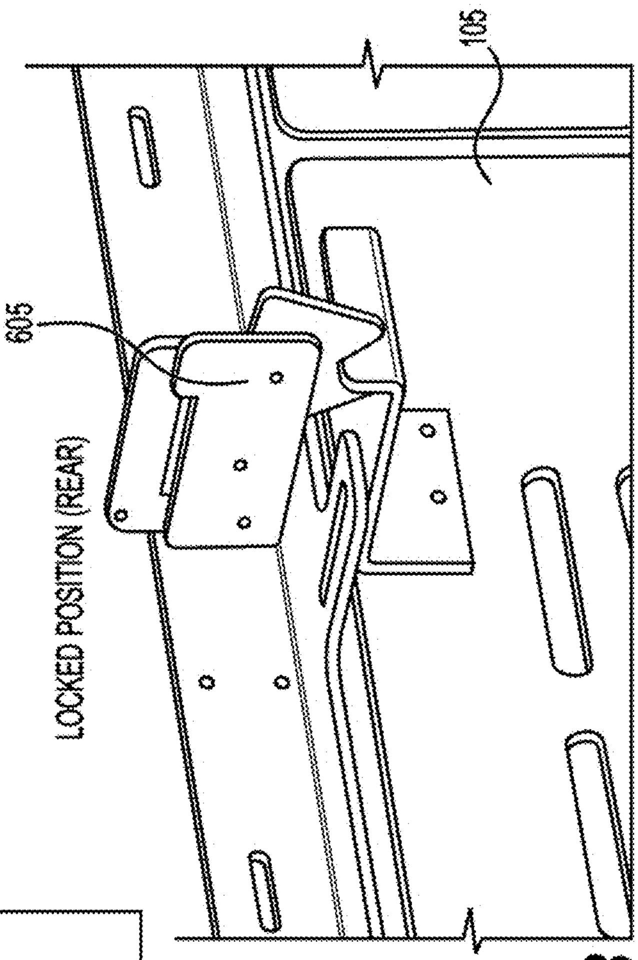
FIGS. 6A-6D depict a latching mechanism according to an embodiment of the present disclosure.
Figure 6A:
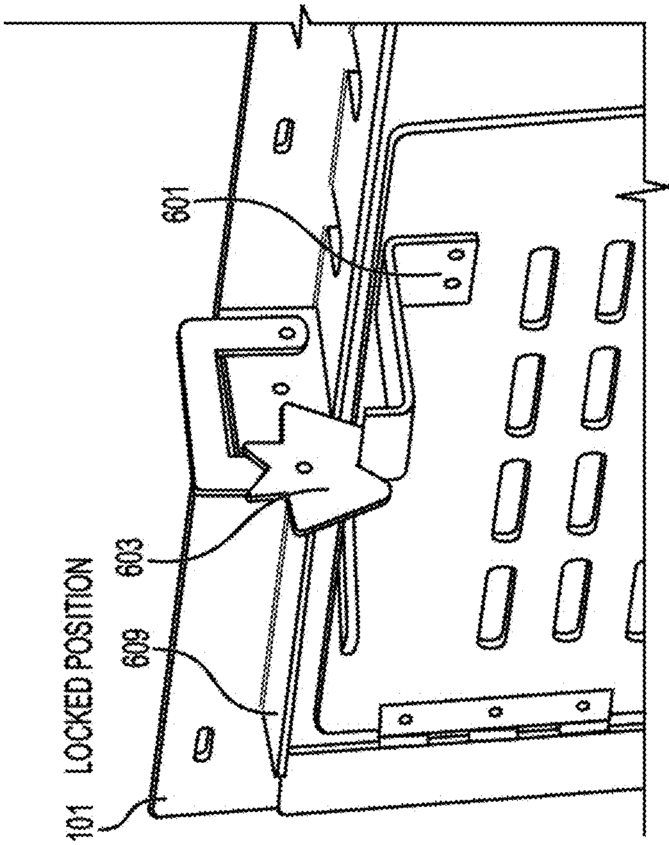
Figure 6D:
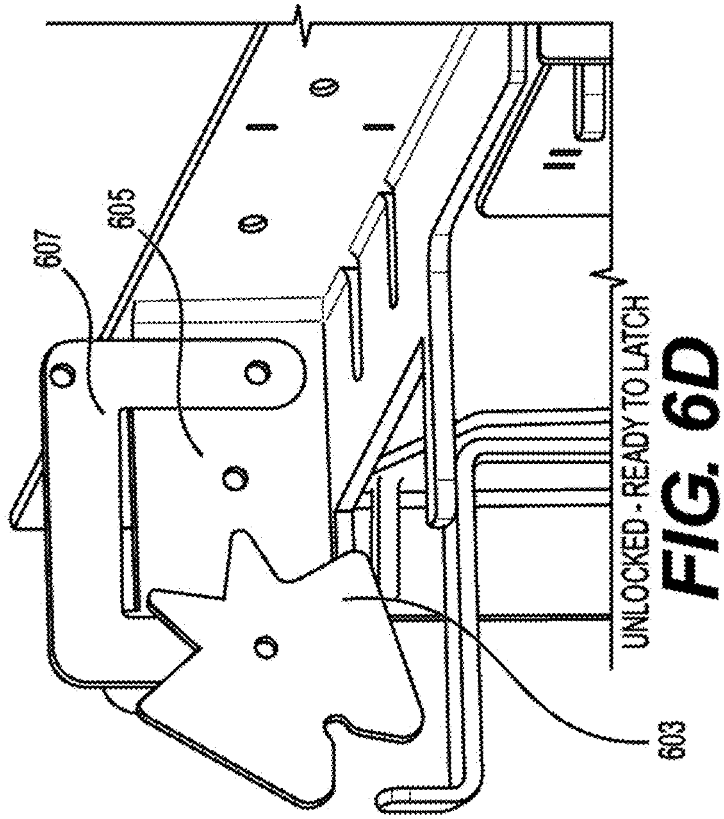
Figure 6C:
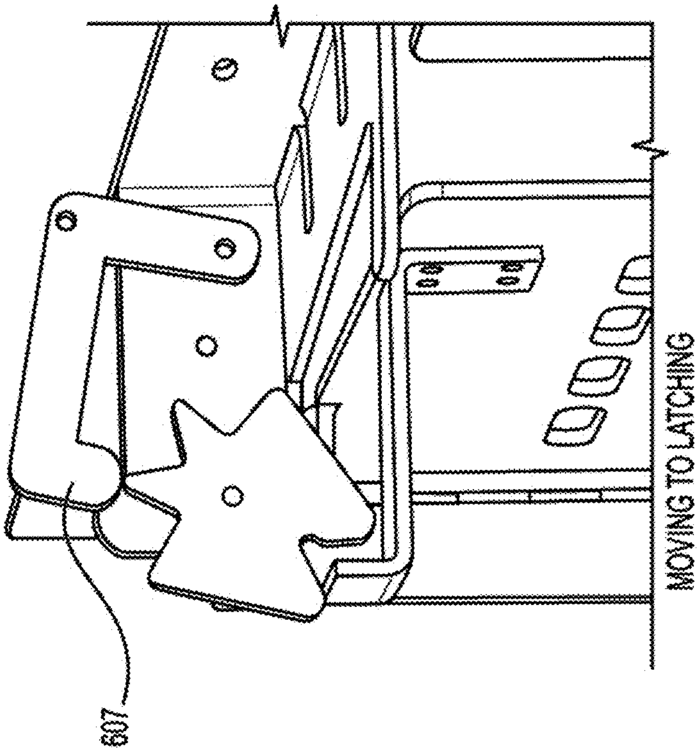
Figure 6E:
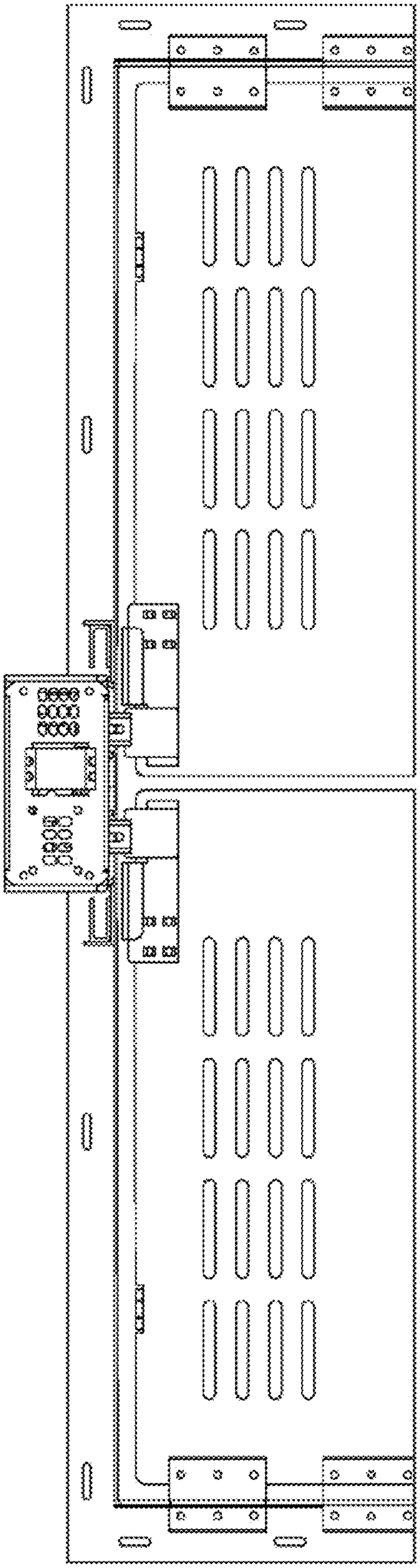
FIG. 6E depicts a back view of a locking mechanism in a locked position according to an embodiment of the present disclosure.
Figure 6F:
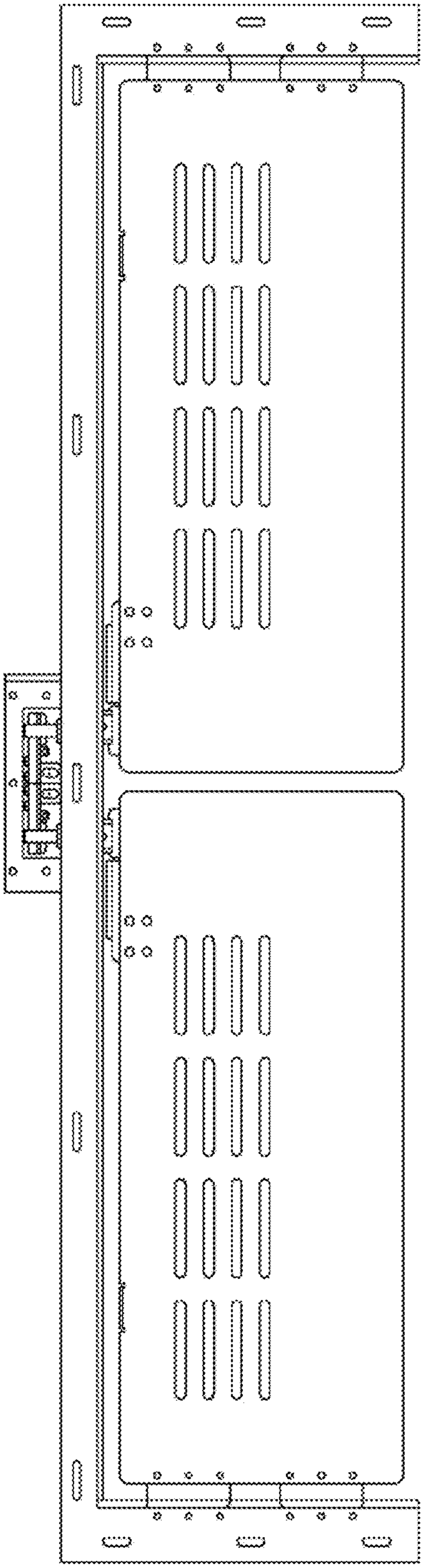
FIG. 6F depicts a front view of a locking mechanism in a locked position according to an embodiment of the present disclosure.
Figure 6G:
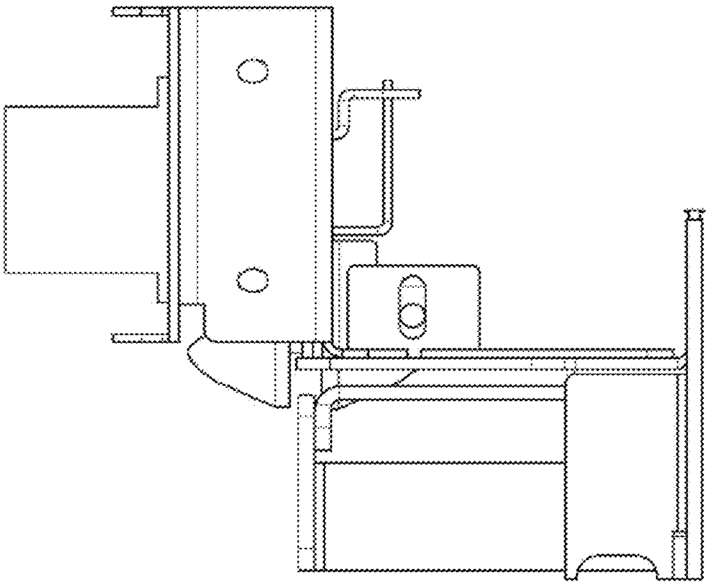
FIG. 6G depicts a side view of a locking mechanism according to an embodiment of the present disclosure.
Figure 6H:
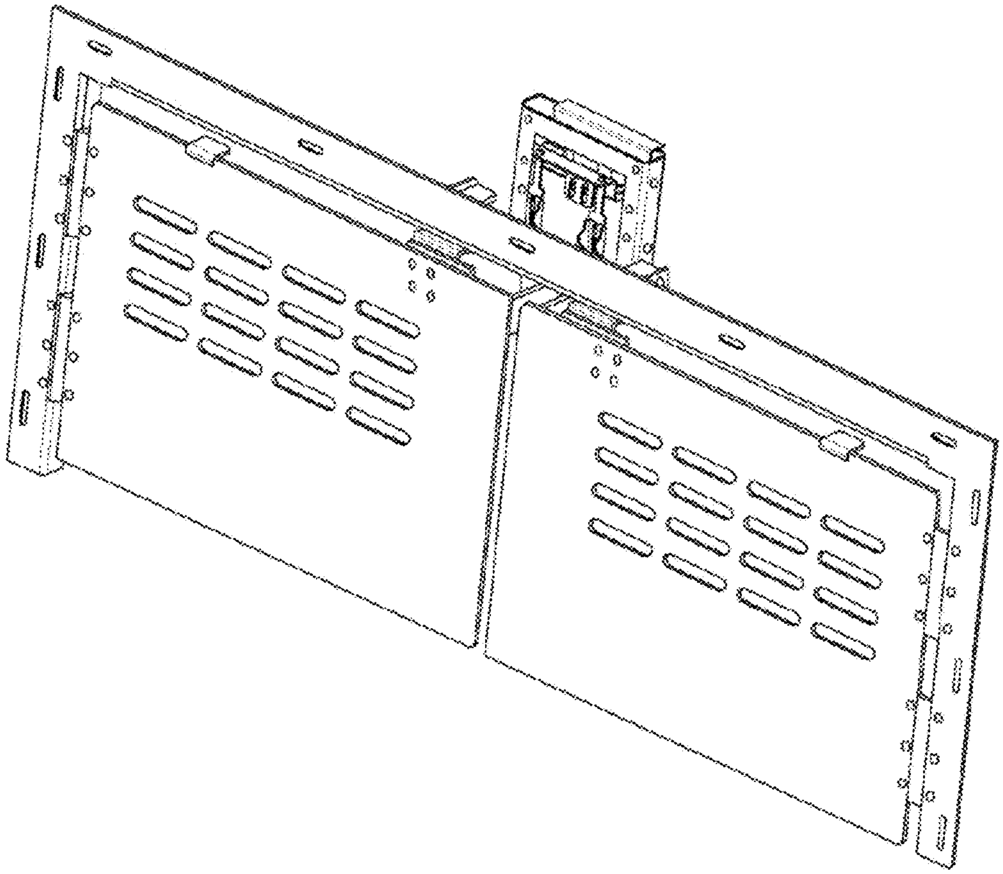
FIG. 6H depicts an isometric view of a locking mechanism according to an embodiment of the present disclosure.
Figure 6I:
FIG. 6I depicts a top view of a locking mechanism according to an embodiment of the present disclosure.

FIGS. 6E-6I depict different stages of locking mechanism attached to the door frame that may enable the mower to pass through the gate while keeping it locked when unauthorized access is made. FIG. 6E depicts a back view of a locking mechanism in a locked position according to an embodiment of the present disclosure. FIG. 6F depicts a front view of a locking mechanism in a locked position according to an embodiment of the present disclosure. FIG. 6G depicts a side view of a locking mechanism according to an embodiment of the present disclosure. FIG. 6H depicts an isometric view of a locking mechanism according to an embodiment of the present disclosure. FIG. 6I depicts a top view of a locking mechanism according to an embodiment of the present disclosure.

Figure 9A:
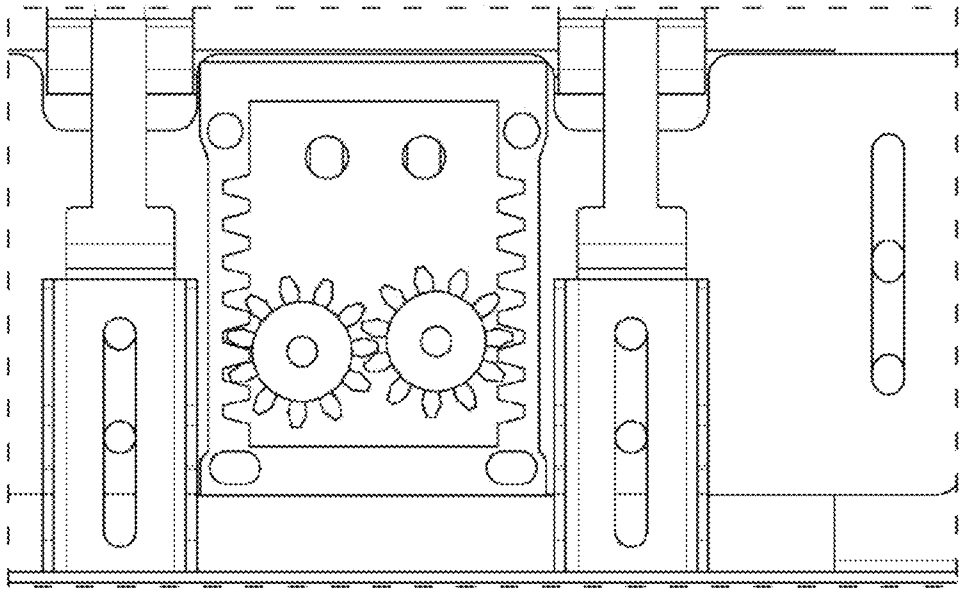
FIG. 9A depicts a double rack and pinion combination for uniform linear motion according to an embodiment of the present disclosure.
Figure 9B:
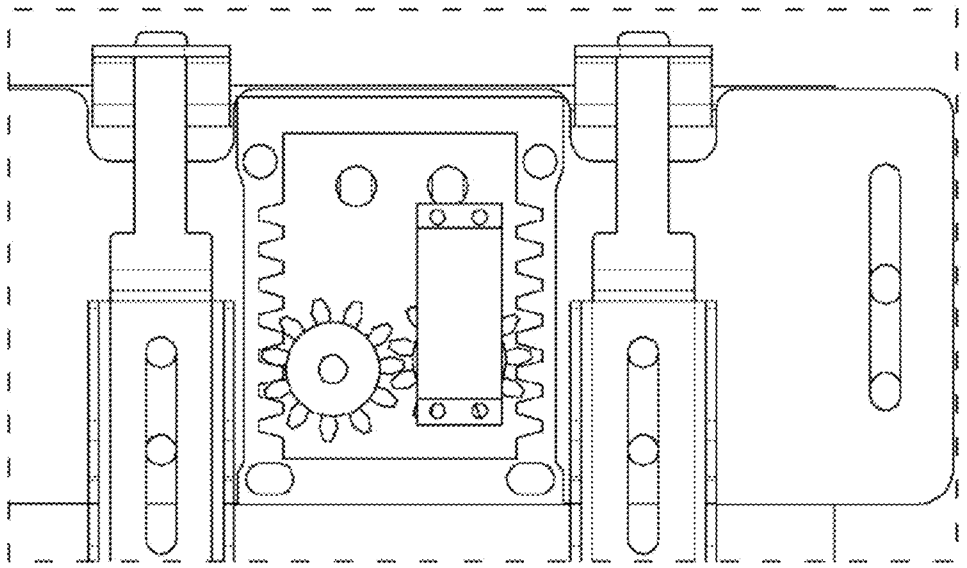
FIG. 9B depicts servo motor position with double rack and pinion combination for uniform linear motion according to an embodiment of the present disclosure.
Figure 9C:
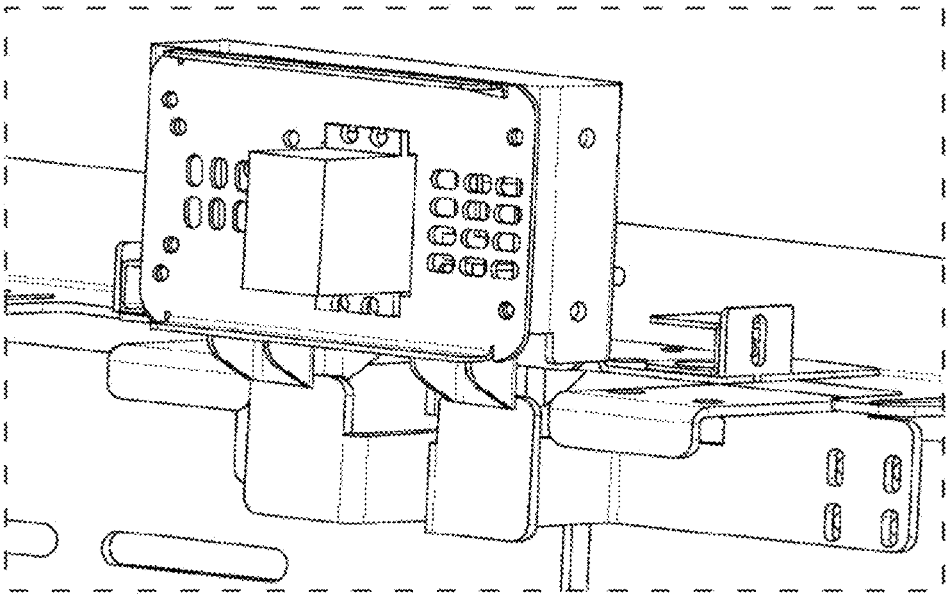
FIG. 9C depicts a locked state closed view according to an embodiment of the present disclosure.
Figure 9D:
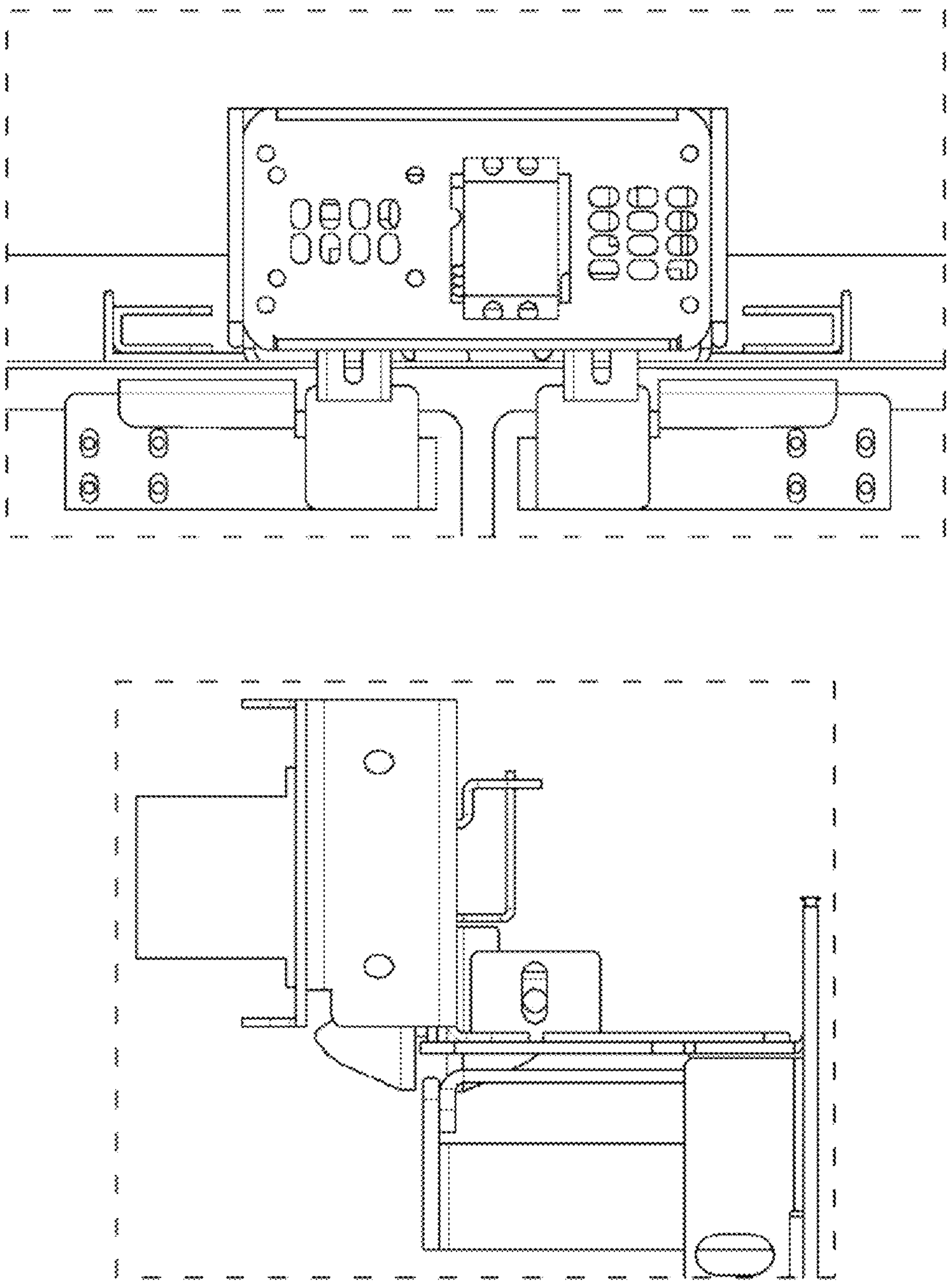
FIG. 9D depicts components of a locking mechanism according to an embodiment of the present disclosure.
Figure 9E:
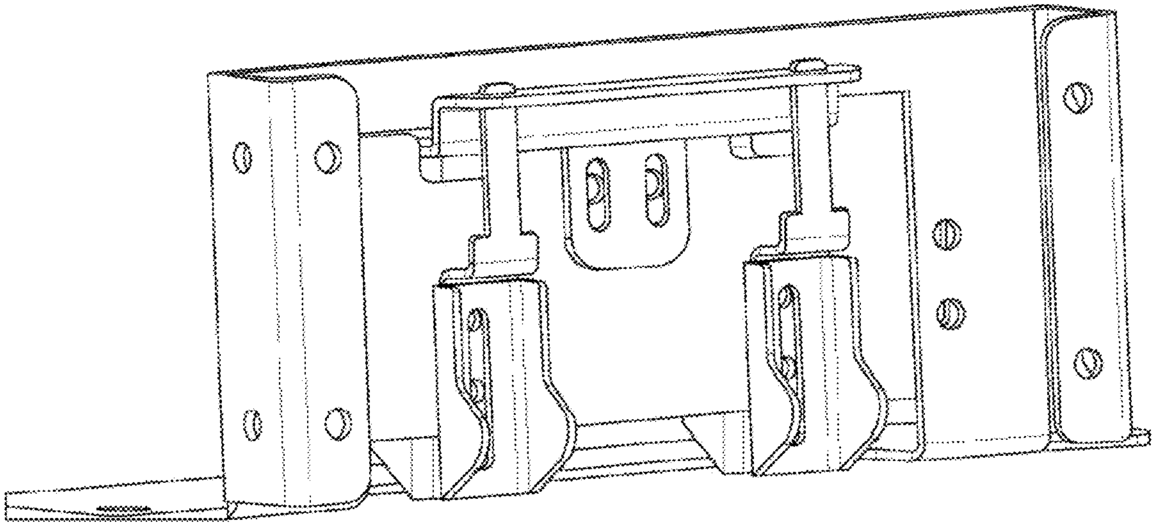
FIG. 9E depicts an inside view of a locking mechanism according to an embodiment of the present disclosure.

FIG. 9A depicts a double rack and pinion combination for uniform linear motion according to an embodiment of the present disclosure. FIG. 9B depicts servo motor position with double rack and pinion combination for uniform linear motion according to an embodiment of the present disclosure. FIG. 9C depicts a locked state closed view according to an embodiment of the present disclosure. FIG. 9D depicts components of a locking mechanism according to an embodiment of the present disclosure. FIG. 9E depicts an inside view of a locking mechanism according to an embodiment of the present disclosure.

Figure 7A:
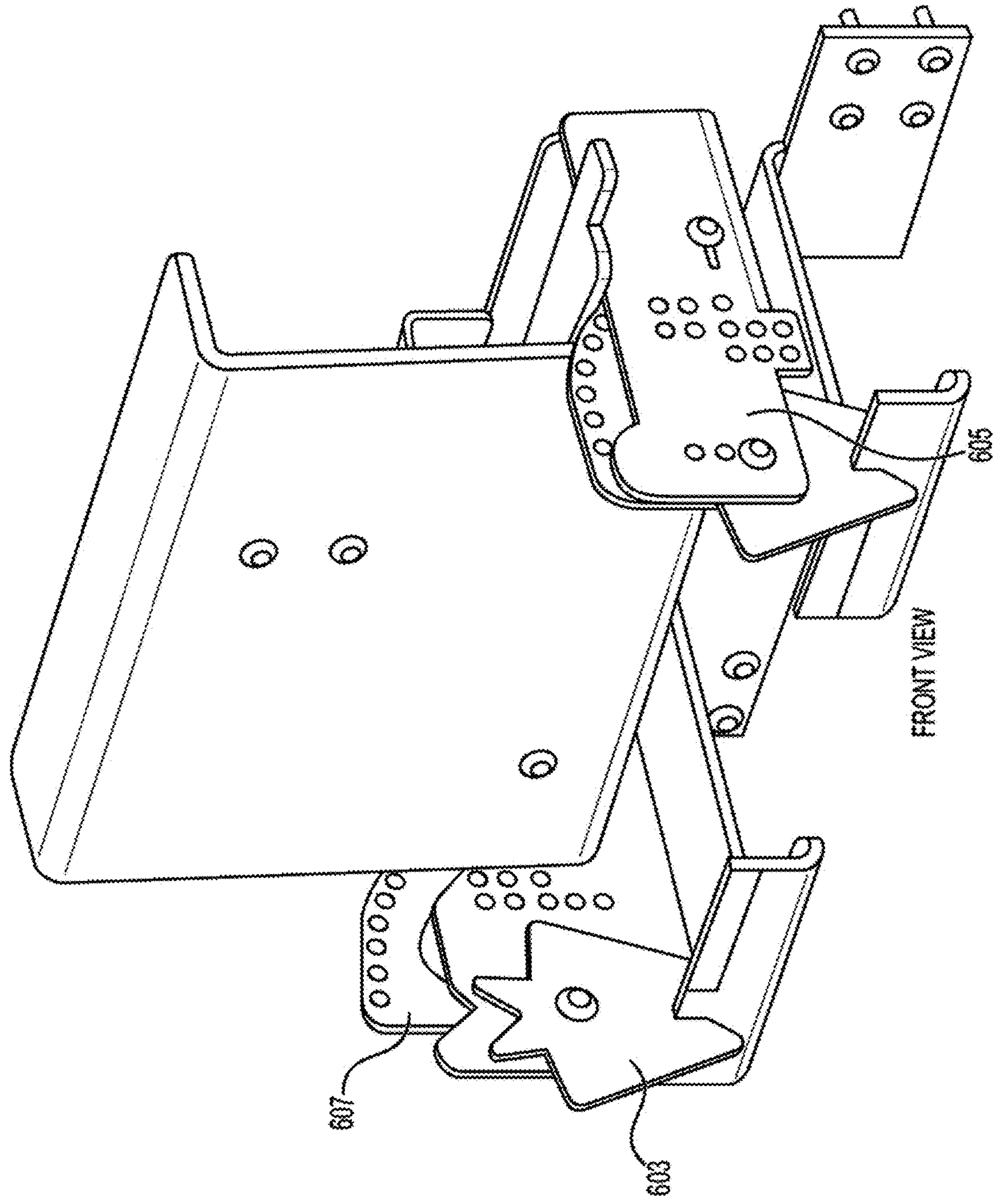
FIGS. 7A and 7B depict a locking mechanism according to an embodiment of the present disclosure.
Figure 7B:
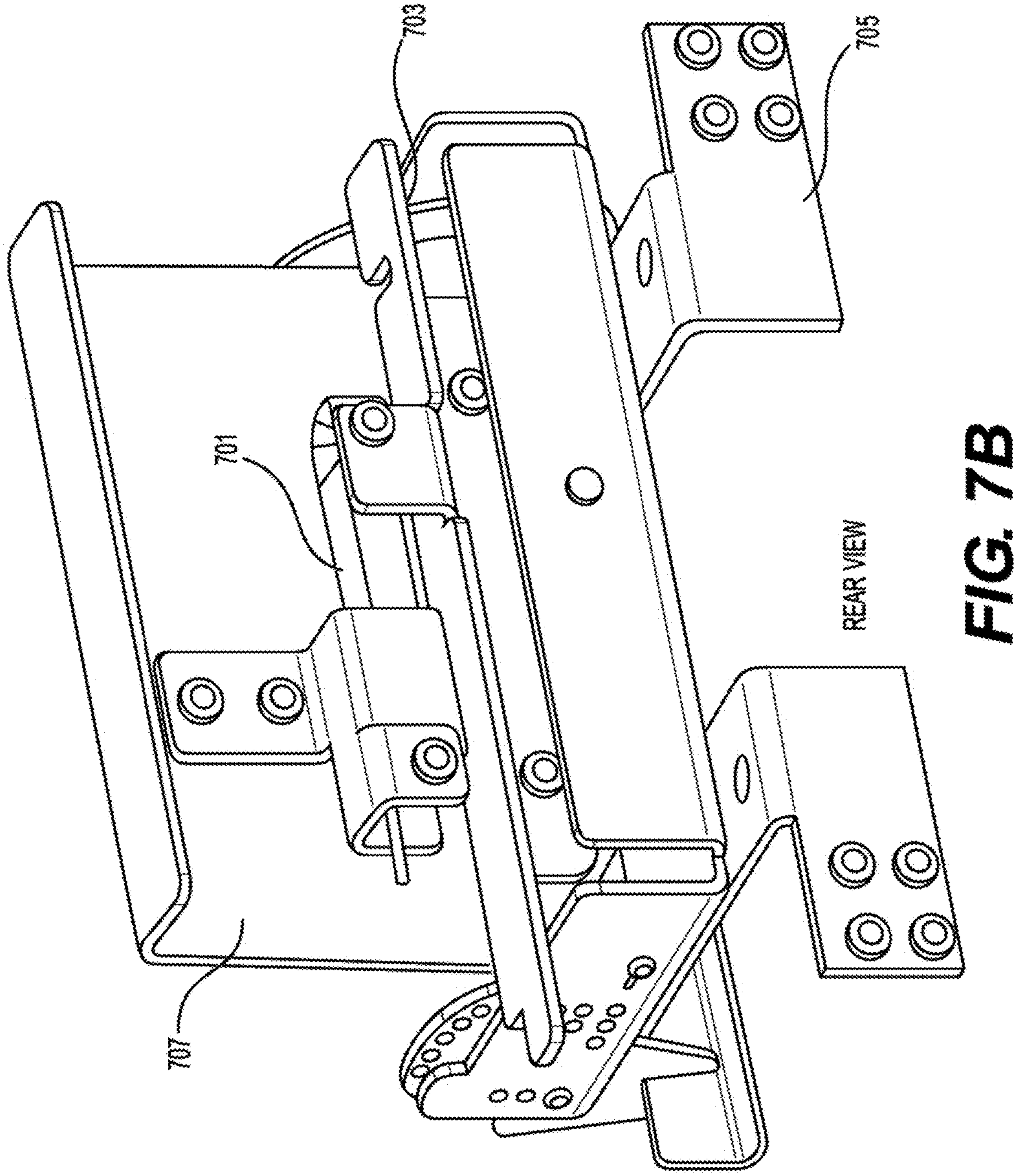

FIGS. 7A and 7B depict a locking mechanism according to an embodiment of the present disclosure. The locking mechanism may have mount 705 that may allow it to be attached to frame 101. Linear actuator 701 may receive signals from the sensor matrix that determines if the gate should be locked or unlocked. Linear actuator 701 may be attached to horizontal beam 703. When linear actuator 701 receives the signal to unlock the gate, it may move beam 703 which may in turn move elbow 607. When linear actuator 701 receives the signal to lock the gate, linear actuator 701 may move to return beam 703 to its original position which may be operable to cause elbow 607 to cause clasp 603 to lock the gate. Barrier 707 may protect linear actuator 701 from any debris that may be kicked up by the wind or the mower moving through the gate.

Figure 10A:
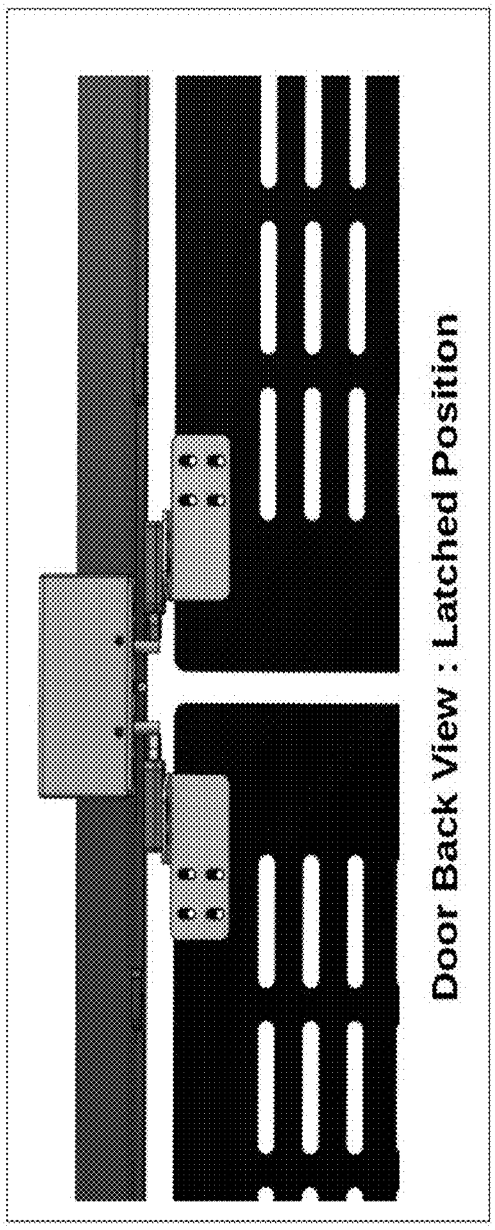
FIG. 10A depicts a door back view in a latched position according to an embodiment of the present disclosure.
Figure 10B:
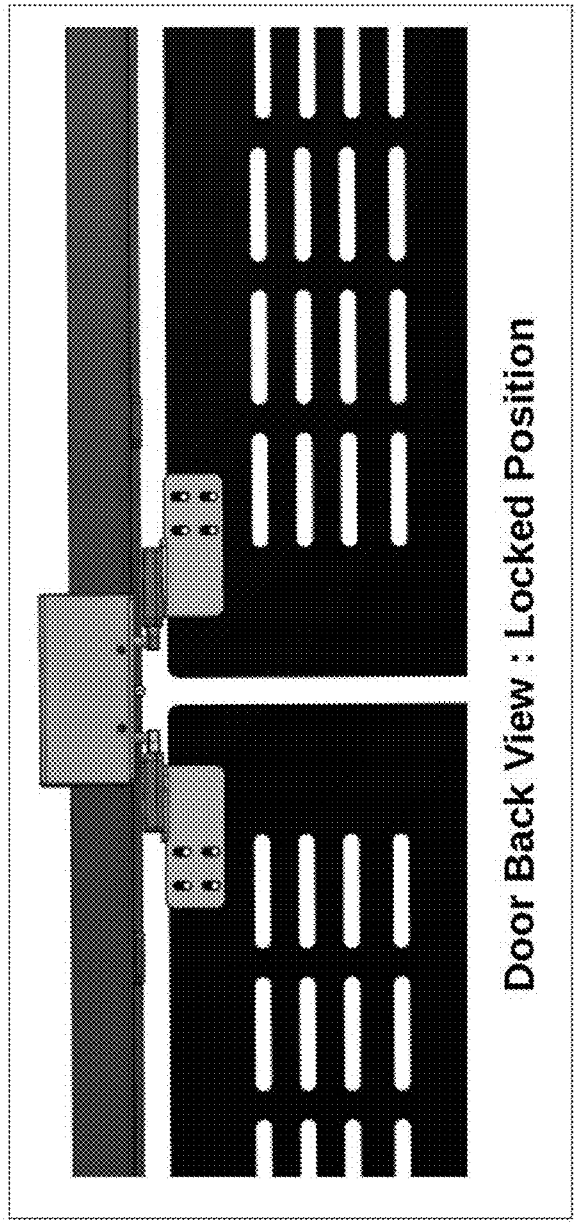
FIG. 10B depicts a door back view in a locked position according to an embodiment of the present disclosure.
Figure 10C:
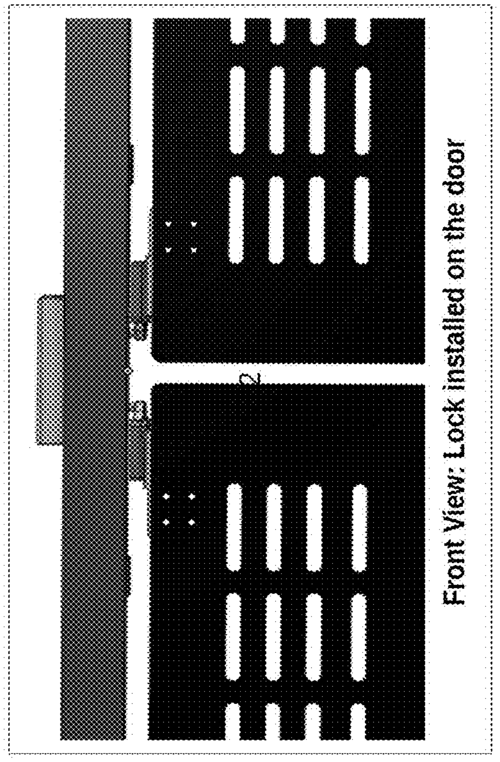
FIG. 10C depicts a front view of a lock installed on a door according to an embodiment of the present disclosure.
Figure 10D:
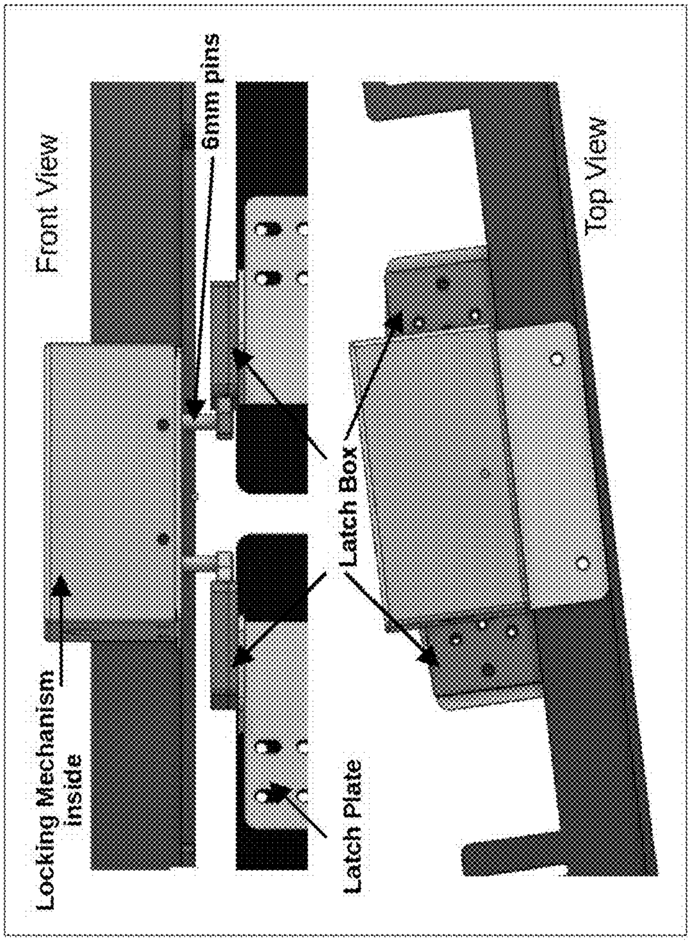
FIG. 10D depicts front and top views after a lock is installed on a door frame according to an embodiment of the present disclosure.
Figure 10E:
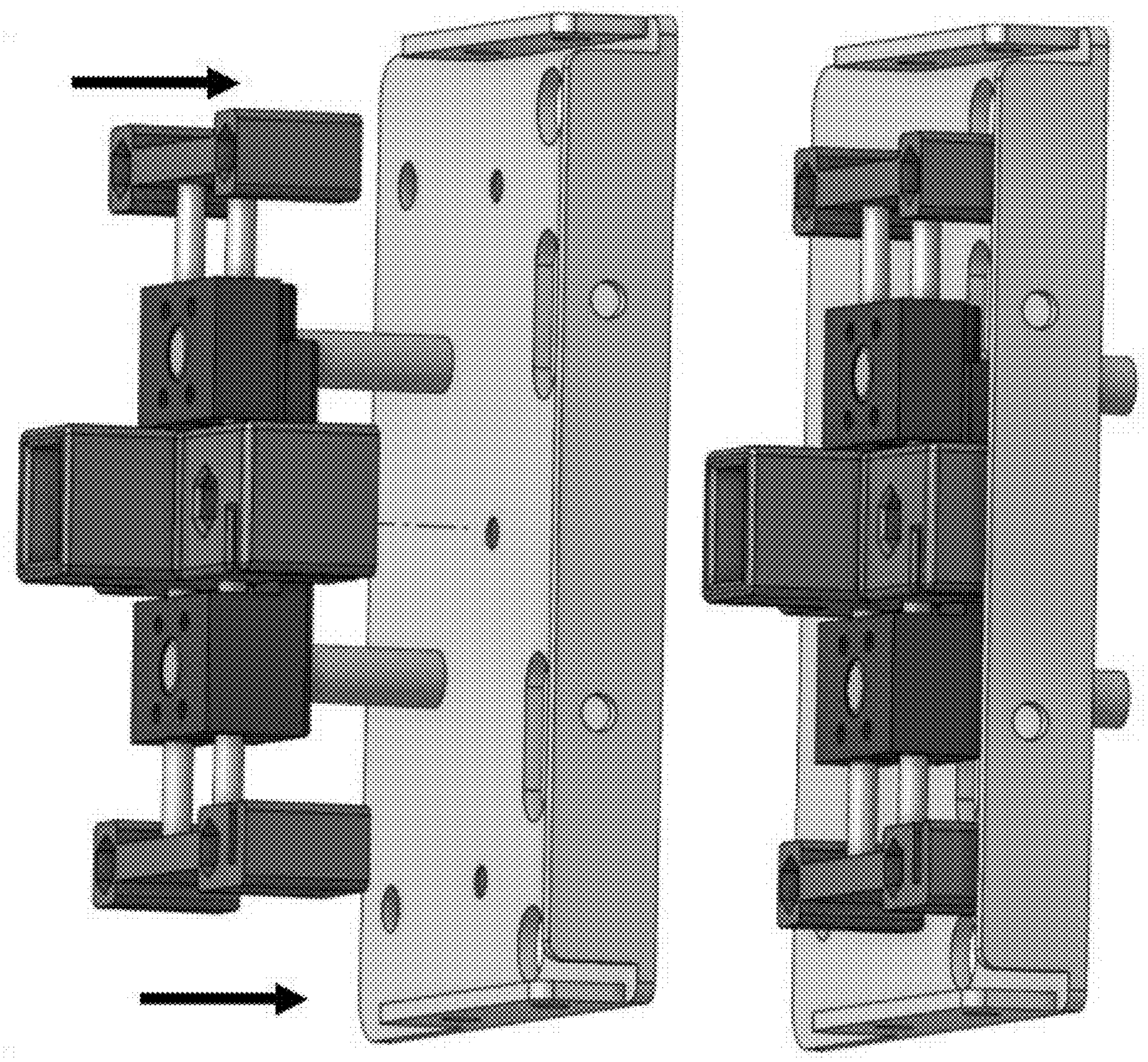
FIG. 10E depicts an expanded view of a locking mechanism assembly according to an embodiment of the present disclosure.
Figure 10F:
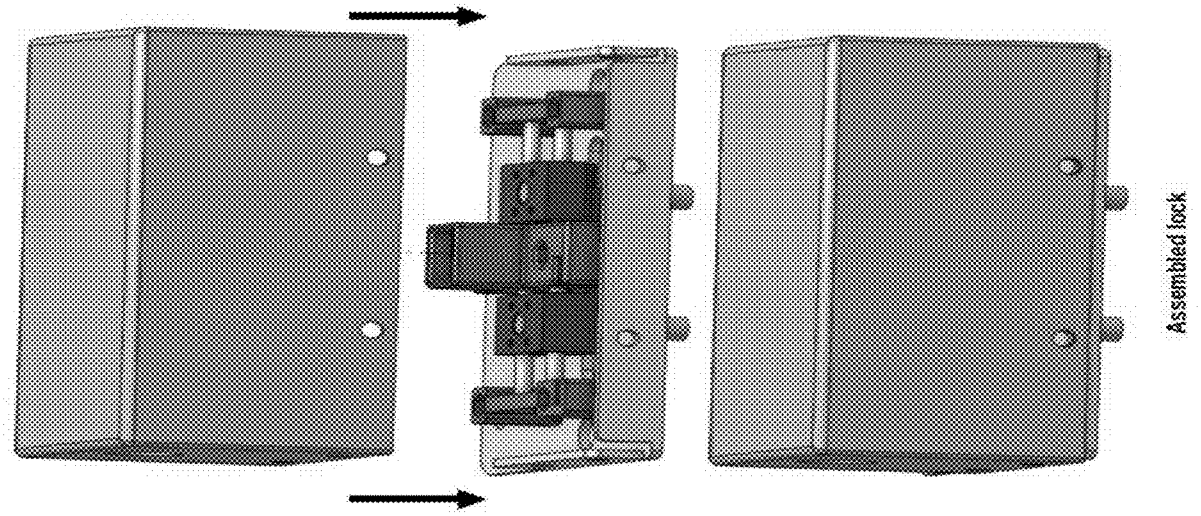
FIG. 10F depicts an expanded view of a locking mechanism assembly according to an embodiment of the present disclosure.
Figure 10G:
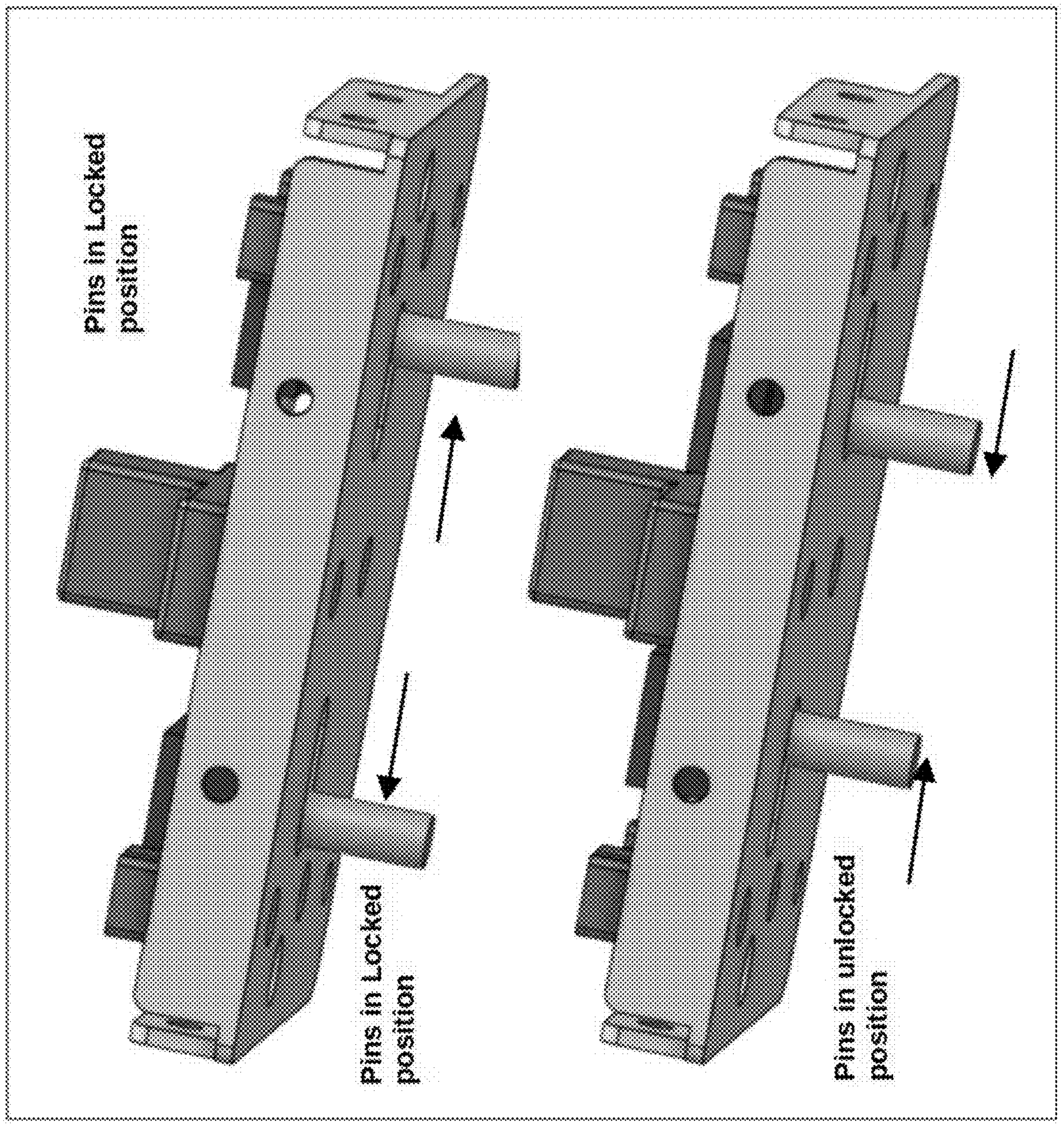
FIG. 10G depicts locked and unlocked positions of pins according to an embodiment of the present disclosure.

FIG. 10A depicts a door back view in a latched position according to an embodiment of the present disclosure. FIG. 10B depicts a door back view in a locked position according to an embodiment of the present disclosure. FIG. 10C depicts a front view of a lock installed on a door according to an embodiment of the present disclosure. FIG. 10D depicts front and top views after a lock is installed on a door frame according to an embodiment of the present disclosure. FIG. 10E depicts an expanded view of a locking mechanism assembly according to an embodiment of the present disclosure. FIG. 10F depicts an expanded view of a locking mechanism assembly according to an embodiment of the present disclosure. FIG. 10G depicts locked and unlocked positions of pins according to an embodiment of the present disclosure.

Figure 10H:
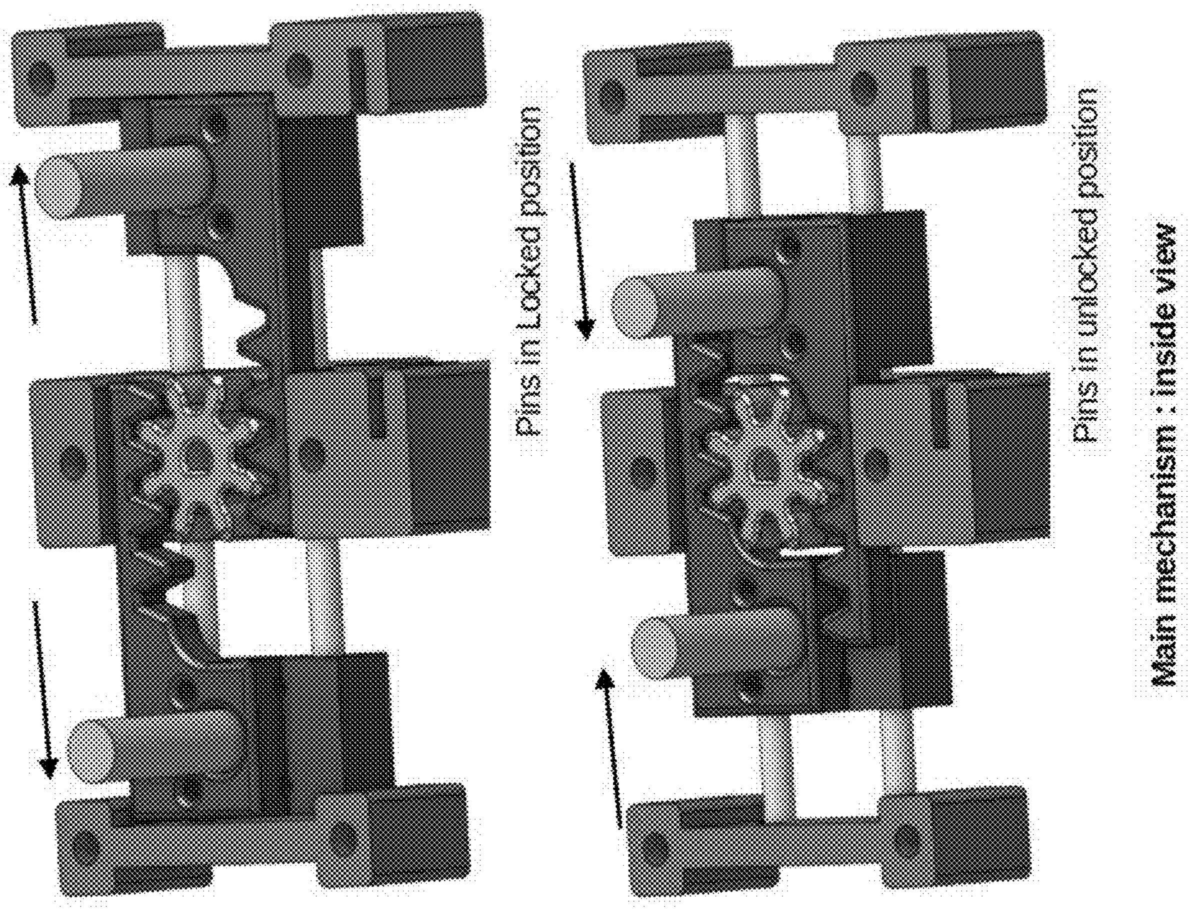
FIG. 10H depicts a dual rack and pinion mechanism inside view for linear movements according to an embodiment of the present disclosure.

FIG. 10H depicts a dual rack and pinion mechanism inside view for linear movements according to an embodiment of the present disclosure. The main locking mechanism may include two 6 mm stainless-steel rods attached to a 3D-printed ABS cube with a rack on one side. This cube may slide along two 3 mm stainless-steel rods for linear motion. The assembly may position two parallel rack gears facing opposite directions with a spur gear at the center driven by a small N20 motor. The stainless-steel rods may act as rails fixed to two 3D-printed parts attached to the base. The mechanism may be mounted on a stainless-steel base and covered with an aluminum cap.

Figure 10I:
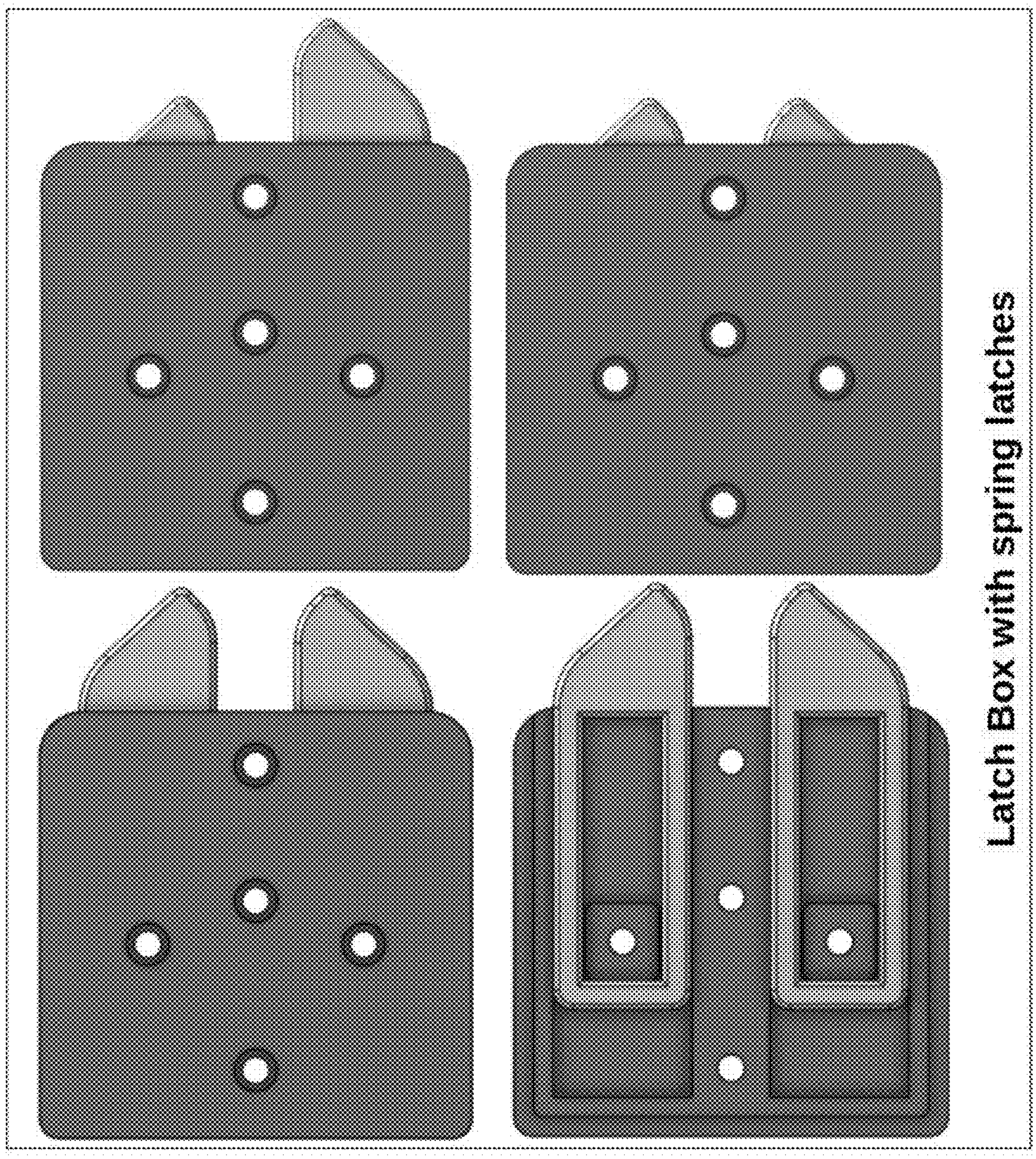
FIG. 10I depicts views of a latch box according to an embodiment of the present disclosure.

FIG. 10I depicts views of a latch box according to an embodiment of the present disclosure. The door may open when the mower pushes against it. Once pushed, the locking mechanism pins may quickly re-engage, locking the door in place when it returns due to the tension springs. Each door may have a latch plate attached. Over each latch plate, a latch box may be mounted. These boxes may contain vacuum-cast casings with metal latches, each spring-loaded and facing opposite directions. The latches in the latch box may lock the angle of the latch such that when the gate swings back the spring within the latch enables the latch to slide over the pins and lock the gate. The tip of the latch may have an affine angle such that, in case the lock is disengaged while the mower is not intending to pass through the gate, the pins will still hold the gate and latches in place without losing the grasp of the gate. This angle on the tip of the latch may be designed such that the mower will still be able to push through the gate, but other factors such as wind will not displace the latches from the grasp of the pins. This feature may enable a higher efficiency of locking and significantly reduces the instances where the door may be left unlocked, when the lock is triggered unintentionally by the mower. The locking mechanism may prevent the door from opening due to wind when unlocked. The door only opens when pushed by the mower, and if not pushed within 8 seconds, the lock automatically re-engages. The mechanism may be intelligent enough to prevent the motor from activating when the doors are open or not properly closed. Users may purchase the door alone or with a locking kit as an add-on module. The locking mechanism can operate using solar power, removing the need for an external power supply, in embodiments of the present disclosure.

The system according to embodiments of the present disclosure may be deployed for robotic lawn mower passage handling through fences and other areas. The door may be all metal, with perforations that may reduce wind load on the door and assist in decreasing the overall weight of the door. The door may be built within a frame (pre-hinged) to make it easy to install. The door may contain screw holes and mounting grooves for installing a locking mechanism as an add-on device. The doors may be designed such that each door can open in both directions with the use of a single spring. No spring may be used in the hinge in order to keep the door aligned all the time, which is necessary for successful latching and locking of a double-sided swinging door. The gap between the doors and the top portion of the door frame may be chosen such that it allows the spring to pass through allowing the door to swing both ways. Adjustment holes may be provided on the door and the frame to adjust the tension in the spring, which will help fine-tune the alignment of the door with the frame especially when a locking mechanism is not being used. The locking mechanism may be battery operated with the option of adding solar power. It will not require a hard-wired power supply to operate. The triggering mechanism may be laid underground with wires running to the control circuitry, making the setup invisible. The dual triggering matrix may enable detection of the mower only when the mower is intending to pass through the gate and will ignore unnecessary unlocking when the mower is mowing. The triggering mechanism on the mower side may only contain a magnet with a mount, which may eliminate the requirement of any battery-operated device on the mower. There may be an optional wireless, proximity-based triggering system using Ultra-Wide Band (UWB) technology. A UWB anchor may be attached to the lock circuitry, while a UWB tag may be placed on the mower. The door may open when the mower pushes on the door. The locking mechanism may be designed such that when unlocked it enables the mower to push the door and pass through and immediately gets into the latching position to latch the door immediately. A user can choose to get the door by itself or get the locking kit which will be an add-on module. The locking mechanism may be capable of running on solar power, eliminating the need for running power to the location. The locking mechanism may have the intelligence to not activate the linear actuator when the doors are open or not properly closed. The control circuit may have expansion slots to add communication modules in the future. For example, a cellular module or Wi-Fi module may be able to control or read status from the door. The control circuit may use an LED indicator and a Piezo Buzzer to indicate the status of the lock, and alert users to any other errors.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of controlling an automated gate for a robotic mower, the method comprising:

receiving a signal from a triggering matrix, the triggering matrix comprising:

a plurality of magnet sensors on either side of the automated gate;

a magnet attached to a front underside of the robotic mower;

a processor attached to a frame adjacent the gate; and a length of wire connecting the plurality of magnetic sensors to the processor, such that a triggering of a control circuit occurs based on proximity of the magnet with the magnet sensors; and a locking mechanism attached to the frame, the locking mechanism comprising:

a horizontal beam;

a linear actuator attached to the horizontal beam, the linear actuator operable to move the horizontal beam;

a support bar;

at least two elbows, wherein one end of each of the at least two elbows is pivotably attached to opposite ends of the support bar, and the at least two elbows in contact with the horizontal beam, for performing a locking and/or unlocking function based on operation of the linear actuator;

a door stop attached to at least one door; and at least two clasps, wherein the at least two clasps are pivotably attached to opposite ends of the support bar, the at least two clasps having a cut-out on an upper side and a cut-out on a bottom side, the cut-out on the upper side operable to accept the at least two elbows and the cut-out on the bottom side operable to accept the door stop;

sending the received signal by the control circuit to the linear actuator to unlock the at least one door of the automated gate;

setting a timer for a specified period of time;

sending a query by means associated with the timer to the control circuit if the at least one door is closed after the specified period of time has elapsed;

receiving a response confirming that the at least one door is closed; and sending a signal by the control circuit to the linear actuator to lock the at least one door.

2. The method of claim 1, the automated gate further comprising:

a plurality of two-way hinges attached to at least one door, the plurality of two-way hinges operable to allow the at least one door to move in two directions;

at least two springs attached to the at least one door, the at least two springs operable to return the at least one door to a closed position when opened; and an extended arm providing an external spring such that there is enough room between the at least one door and a frame on the top to allow the external spring to extend without interrupting with the operation of the at least one door.

3. The method of claim 1, wherein the automated gate is made of steel.

4. The method of claim 1 further comprising:

a frame.

5. The method of claim 4, the frame further comprising:

a groove on a top side of the frame to assist in attachment to the fence.

6. The method of claim 4, wherein a width of the frame is longer than the robotic mower width by approximately 1.5 times the width of the robotic mower to accommodate different angles at which the robotic mower enters the automated gate.

7. The method of claim 1, the at least two doors further comprising:

a plurality of holes to reduce the weight of the at least one door and to reduce the effect of wind on the automated gate.

8. The method of claim 1, wherein a bottom edge of the at least one door is at least two inches above ground level.

9. The method of claim 1, wherein the magnet is encased in a plastic enclosure to protect it from the blades of the robotic mower.

10. The method of claim 1, wherein the linear actuator has a direct current (DC) motor.

11. The method of claim 1, wherein the linear actuator is battery powered.

* * * * *